US009723316B2

(12) United States Patent
Minezawa et al.

(10) Patent No.: US 9,723,316 B2
(45) Date of Patent: Aug. 1, 2017

(54) IMAGE ENCODING DEVICE, IMAGE DECODING DEVICE, IMAGE ENCODING METHOD, IMAGE DECODING METHOD, AND IMAGE PREDICTION DEVICE

(75) Inventors: Akira Minezawa, Tokyo (JP); Kazuo Sugimoto, Tokyo (JP); Shunichi Sekiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 841 days.

(21) Appl. No.: 14/114,567

(22) PCT Filed: May 30, 2012

(86) PCT No.: PCT/JP2012/003555
§ 371 (c)(1),
(2), (4) Date: Oct. 29, 2013

(87) PCT Pub. No.: WO2012/176381
PCT Pub. Date: Dec. 27, 2012

(65) Prior Publication Data
US 2014/0064368 A1  Mar. 6, 2014

(30) Foreign Application Priority Data

Jun. 24, 2011 (JP) .................................. 2011-140598
Jan. 19, 2012 (JP) .................................. 2012-009115

(51) Int. Cl.
*H04N 7/34* (2006.01)
*H04N 19/159* (2014.01)
(Continued)

(52) U.S. Cl.
CPC .......... *H04N 19/159* (2014.11); *H04N 19/11* (2014.11); *H04N 19/14* (2014.11); *H04N 19/157* (2014.11);
(Continued)

(58) Field of Classification Search
CPC ................................................ H04N 19/00763
(Continued)

(56) References Cited

U.S. PATENT DOCUMENTS 6,061,474 A        5/2000  Kajiwara et al.
2005/0243920 A1  11/2005  Murakami et al.
(Continued)

FOREIGN PATENT DOCUMENTS

CA    2833902 A1    12/2012
EP    2 200 324 A1   6/2010
(Continued)

OTHER PUBLICATIONS

Zhou et al. "An interpolation method by predicting the direction of pixel texture changing trend for H.264/AVC intra prediction", Second International Symposium on Intelligent Information Technology Application (IITA 2008), IEEE, Dec. 2008, vol. 1, pp. 884 to 888.*
(Continued)

*Primary Examiner* — Behrooz Senfi
*Assistant Examiner* — Jonathan Messmore
(74) *Attorney, Agent, or Firm* — Birch, Stewart, Kolasch & Birch, LLP

(57) ABSTRACT

When an intra prediction parameter indicates a horizontal prediction process, an intra prediction unit adds a value proportional to a change in a horizontal direction of the luminance values of pixels adjacent to the top of each block, which is a unit for prediction process of a coding block, to the luminance value of a pixel adjacent to the left of the block to set a result of the addition as a predicted value of a prediction image, whereas when the intra prediction parameter indicates a vertical prediction process, the intra prediction unit adds a value proportional to a change in a vertical direction of the luminance values of pixels adjacent
(Continued)

to the left of the block to the luminance value of the pixel adjacent to the top of the block to set the result of the addition as a predicted value of the prediction image.

5 Claims, 15 Drawing Sheets

(51) Int. Cl.
    *H04N 19/176*     (2014.01)
    *H04N 19/593*     (2014.01)
    *H04N 19/11*     (2014.01)
    *H04N 19/14*     (2014.01)
    *H04N 19/157*     (2014.01)
    *H04N 19/182*     (2014.01)

(52) U.S. Cl.
    CPC ......... *H04N 19/176* (2014.11); *H04N 19/182* (2014.11); *H04N 19/593* (2014.11)

(58) Field of Classification Search
    USPC .................................................... 375/240.12
    See application file for complete search history.

(56) References Cited

U.S. PATENT DOCUMENTS

| | | | |
|---|---|---|---|
| 2010/0208802 | A1 | 8/2010 | Tsukuba et al. |
| 2010/0208803 | A1 | 8/2010 | Matsuo et al. |
| 2011/0090969 | A1 | 4/2011 | Sung et al. |
| 2011/0243225 | A1* | 10/2011 | Min ...................... H04N 19/44 375/240.12 |
| 2012/0213278 | A1 | 8/2012 | Yasugi et al. |
| 2013/0188706 | A1 | 7/2013 | Minezawa et al. |
| 2014/0092980 | A1 | 4/2014 | Guo et al. |

FOREIGN PATENT DOCUMENTS

| | | |
|---|---|---|
| JP | 9-9265 A | 1/1997 |
| JP | 2006-352181 A | 12/2006 |
| JP | 2014-519768 A | 8/2014 |
| RU | 2496252 C2 | 10/2013 |
| WO | WO 2009/051091 A1 | 4/2009 |
| WO | WO 2011/049119 A1 | 4/2011 |
| WO | WO 2012/042720 A1 | 4/2012 |
| WO | WO 2012/096150 A1 | 7/2012 |
| WO | WO 2012/176381 A1 | 12/2012 |

OTHER PUBLICATIONS

Bjontegaard, "H.26L Test Model Long Term No. 4 (TML-4) draft0", ITU—Telecommunications Standardization Sector, Study Group 16, Video Coding Experts Group (Question 15), Document Q15-J-72, Tenth Meeting: Osaka, Japan, May 16-18, 2000, pp. 1-30.
Li et al. "Gradient Intra Prediction for Coding of Computer Animated Videos", IEEE Workshop on Multimedia Signal Processing, Victoria, BC, Canada, Oct. 3-6, 2006, pp. 50-53.
Matsuo et al. "Intra prediction with spatial gradient", SPIE-IS&T, vol. 7257, Visual Communications and Image Processing, San Jose, USA, Jan. 20-22, 2009, 9 pages.
Matsuo et al. "Intra Prediction with Spatial Gradients and Multiple Reference Lines", Picture Coding Symposium 2009, May 6, 2009, 4 pages.
Matsuo et al. "Weighted Intra Prediction", ITU—Telecommunications Standardization Sector, Study Group 16 Question 6, Video Coding Experts Group (VCEG), Document VCEG-AG18, 33rd Meeting: Shenzhen, China, Oct. 20, 2007, pp. 1-4.
Minezawa et al. "An improved intra vertical and horizontal prediction", Joint Collaborative Team on Video Coding (JCT-VC) of ITU-T SG16 WP3 and ISO/IEC JTC1/SC29/WG11, Document: JCTVC-F172, 6th Meeting: Torino, IT, Jul. 14-22, 2011, pp. 1-6.
Russian Office Action dated Aug. 14, 2014 for Russian Application No. 2014102221/07 with English translation.
Japanese Office Action dated Nov. 25, 2013 issued in the corresponding Japanese Patent Application No. 2013-211099 with English translation.
Minezawa et al., "An improved intra vertical and horizontal prediction", Joint Collaborative Team on Video Coding (JCT-VC) of ITU-T SG16WP3 and ISO/IEC JTC1/SC29/WG11, 6th Meeting, Jul. 14-22, 2011.
Series H: Audiovisual and Multimedia Systems "Infrastructure of audiovisual services—Coding of moving video", ITU-T Telecommunication Standardization Sector of ITU, H.264, Mar. 2010.
Sugimoto et al., "LUT-based adaptive filtering on intra prediction samples", Joint Collaborative Team on Video Coding (JCT-VC) of ITU-T SG16 WP3 and ISO/IEC JTC1/SC29/WG11, JCTVC-D109, Jan. 20-28, 2011, p. 1-4.

* cited by examiner

| Intra Prediction Mode Index | Intra Prediction Mode |
|---|---|
| 0 | Vertical Prediction |
| 1 | Horizontal Prediction |
| 2 | Average (DC) Prediction |
| 3~N-1 | Diagonal Prediction |

N: Number Of Intra Prediction Modes

In Case Of $l_i^n = m_i^n = 4$

In Case Of $l_i^n = m_i^n = 4$

In Case Of $l_i^n = m_i^n = 4$

In Case Of $l_i^n = m_i^n = 4$

In Case Of $l_i^n = m_i^n = 4$

FIG.15
· Original Image
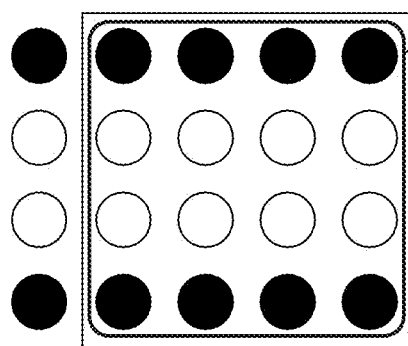
Original Signal Value
Target Block To Be Predicted
· Prediction Image
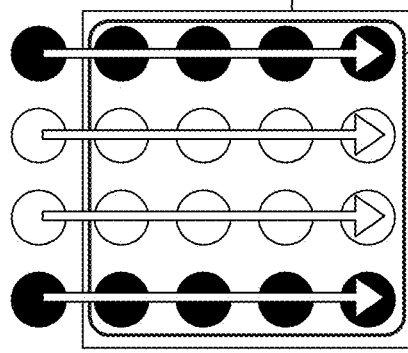
Prediction Error : Small
Predicted Value
○ Pixel
⇒ Prediction Direction

| Intra Prediction Mode Index | Intra Prediction Mode |
|---|---|
| 0 | Planar Prediction |
| 1 | Vertical Prediction |
| 2 | Horizontal Prediction |
| 3 | Average (DC) Prediction |
| 4∼$N_I$-1 | Diagonal Prediction |

$N_I$:Number Of Intra Prediction Modes

IMAGE ENCODING DEVICE, IMAGE DECODING DEVICE, IMAGE ENCODING METHOD, IMAGE DECODING METHOD, AND IMAGE PREDICTION DEVICE

FIELD OF THE INVENTION

The present invention relates to an image encoding device for and an image encoding method of encoding an image with a high degree of efficiency, an image decoding device for and an image decoding method of decoding an encoded moving image with a high degree of efficiency, and an image prediction device.

BACKGROUND OF THE INVENTION

For example, in accordance with an international standard video encoding method, such as MPEG (Moving Picture Experts Group) or "ITU-T H.26x", an inputted video frame is divided into rectangular blocks (coding blocks), a prediction process using an already-encoded image signal is carried out on each coding block to generate a prediction image, and orthogonal transformation and a quantization process are carried out on a prediction error signal which is the difference between the coding block and the prediction image in units of a block in order to compress the information about the inputted video frame.

For example, in the case of AVC/H.264 (ISO/IEC 14496-10|ITU-T H.264) which is an international standard method, an intra prediction process from already-encoded adjacent pixels or a motion-compensated prediction process between adjacent frames is carried out (refer to nonpatent reference 1). In the case of MPEG-4 AVC/H.264, one prediction mode can be selected from among a plurality of prediction modes for each block in an intra prediction mode of luminance. FIG. 14 is an explanatory drawing showing intra prediction modes in the case of a 4×4 pixel block size for luminance. In FIG. 14, each white circle in a block shows a pixel to be encoded, and each black circle shows an already-encoded pixel that is used for prediction. In the case of a 4×4 pixel block size for luminance, nine intra prediction modes including a mode 0 to a mode 8 are defined.

In the example shown in FIG. 14, the mode 2 is the one in which an average prediction is carried out in such a way that each pixel in the block is predicted by using the average of adjacent pixels located on the upper and left sides of the block. The modes other than the mode 2 are intra prediction modes in each of which a directional prediction is carried out. The mode 0 is the one in which a vertical prediction is carried out in such a way that adjacent pixels located on the upper side of the block are repeatedly replicated to create plural rows of pixels along a vertical direction to generate a prediction image. For example, the mode 0 is selected when the coding block is a vertically striped pattern. The mode 1 is the one in which a horizontal prediction is carried out in such a way that adjacent pixels located on the left side of the block are repeatedly replicated to create plural columns of pixels along a horizontal direction to generate a prediction image. For example, the mode 1 is selected when the coding block is a horizontally striped pattern. In each of the modes 3 to 8, interpolation pixels running in a predetermined direction (i.e., a direction shown by arrows) are generated by using the already-encoded pixels located on the upper or left side of the block to generate a prediction image.

In this case, the block size for luminance to which an intra prediction is applied can be selected from 4×4 pixels, 8×8 pixels, and 16×16 pixels. In the case of 8×8 pixels, nine intra prediction modes are defined, like in the case of 4×4 pixels. However, already-encoded pixels themselves are not used as pixels which are used for prediction, but the already-encoded pixels on which a filtering process has been carried out are used as the pixels which are used for prediction. In contrast with this, in the case of 16×16 pixels, four intra prediction modes which are called Plane predictions are defined in addition to intra prediction modes associated with an average prediction, a vertical prediction, and a horizontal prediction. In each of the intra prediction modes associated with Plane predictions, the value of a pixel which is generated through interpolation in a diagonal direction on the already-encoded adjacent pixels located on the upper and left sides of the block is set as a predicted value.

Because a directional prediction mode is the one in which a predicted value is generated by repeatedly replicating either the pixels adjacent to the block or the interpolation pixels generated from the adjacent pixels in a predetermined direction (prediction direction), the prediction efficiency increases and the code amount can be reduced when the direction of a boundary (edge) of an object in the target block to be predicted as shown in FIG. 15 matches the prediction direction, and the signal value in the block is kept constant along the prediction direction.

RELATED ART DOCUMENT

Nonpatent Reference

Nonpatent reference 1: MPEG-4 AVC (ISO/IEC 14496-10)/H.ITU-T 264 standards

SUMMARY OF THE INVENTION

Problems to be Solved by the Invention

Because the conventional moving image encoding device is constructed as above, the conventional moving image encoding device can predict a frame image with a high degree of accuracy by using a directional prediction when the direction of a boundary (edge) of an object in the target block to be predicted matches the prediction direction, and the signal value in the target block to be predicted is kept constant along the prediction direction. A problem is, however, that when the signal value varies along the prediction direction, as shown in FIG. 16, even if the direction of a boundary (edge) of an object in the target block to be predicted matches the prediction direction, the prediction error becomes large.

The present invention is made in order to solve the above-mentioned problem, and it is therefore an object of the present invention to provide an image encoding device, an image decoding device, an image encoding method, an image decoding method, and an image prediction device capable of implementing a high-accuracy prediction even when the signal value varies along the prediction direction, thereby being able to improve the image quality.

Means for Solving the Problem

In accordance with the present invention, there is provided an image encoding device in which when an intra prediction parameter indicates a horizontal prediction process, an intra prediction unit adds a value proportional to a change in a horizontal direction of the luminance values of pixels adjacent to the top of each block, which is a unit for prediction process of a coding block, to the luminance value of a pixel adjacent to the left of the block to set the result of the addition as a predicted value of a prediction image, whereas when the intra prediction parameter indicates a vertical prediction process, the intra prediction unit adds a value proportional to a change in a vertical direction of the luminance values of pixels adjacent to the left of the block to the luminance value of the pixel adjacent to the top of the block to set the result of the addition as a predicted value of the prediction image.

Advantages of the Invention

Because the image encoding device according to the present invention is constructed in such a way that, when the intra prediction parameter indicates a horizontal prediction process, the intra prediction unit adds a value proportional to a change in the horizontal direction of the luminance values of the pixels adjacent to the top of each block to the luminance value of the pixel adjacent to the left of the block to set the result of the addition as a predicted value of the prediction image, whereas when the intra prediction parameter indicates a vertical prediction process, the intra prediction unit adds a value proportional to a change in the vertical direction of the luminance values of pixels adjacent to the left of the prediction block to the luminance value of the pixel adjacent to the top of the block to set the result of the addition as a predicted value of the prediction image, there is provided an advantage of being able to implement a high-accuracy prediction, thereby improving the image quality, even when the signal value varies along the prediction direction.

BRIEF DESCRIPTION OF THE FIGURES

FIG. 15 is an explanatory drawing showing an example of a prediction image which is predicted with a high degree of accuracy by using a horizontal prediction;

EMBODIMENTS OF THE INVENTION

Hereafter, in order to explain this invention in greater detail, the preferred embodiments of the present invention will be described with reference to the accompanying drawings.

Embodiment 1

Figure 1:
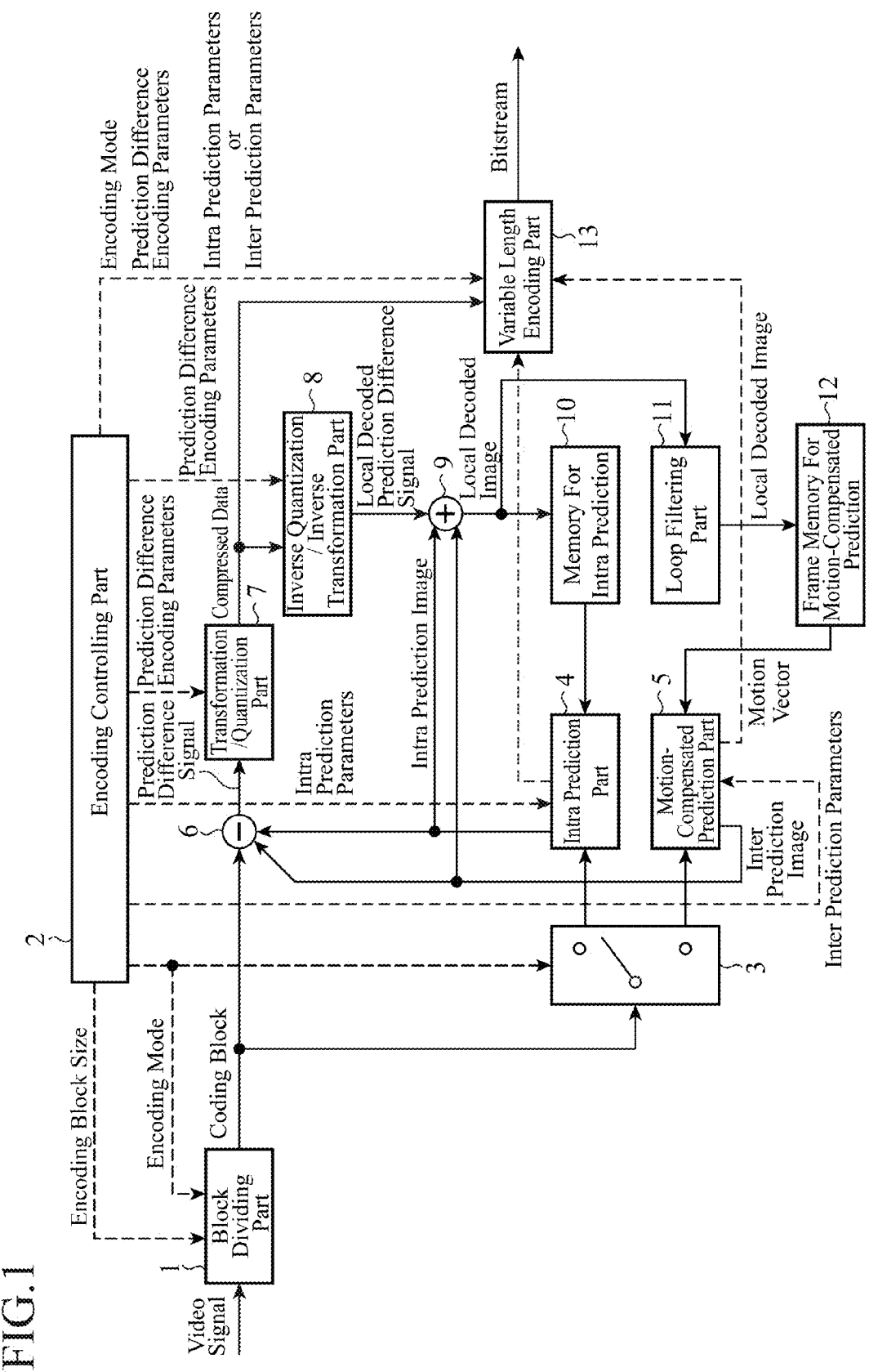
FIG. 1 is a block diagram showing a moving image encoding device in accordance with Embodiment 1 of the present invention.

FIG. 1 is a block diagram showing a moving image encoding device in accordance with Embodiment 1 of the present invention. Referring to FIG. 1, a block dividing part 1 carries out a process of, when receiving a video signal showing an inputted image, dividing the inputted image into largest coding blocks which are coding blocks each having a maximum size determined by an encoding controlling part 2, and also dividing each of the largest coding blocks into blocks hierarchically until the number of hierarchical layers reaches an upper limit on the number of hierarchical layers which is determined by the encoding controlling part 2. More specifically, the block dividing part 1 carries out a process of dividing the inputted image into coding blocks according to a division which is determined by the encoding controlling part 2, and outputting each of the coding blocks. Each of the coding blocks is further divided into one or more prediction blocks each of which is a prediction unit. The block dividing part 1 constructs a block dividing unit.

The encoding controlling part 2 carries out a process of determining a maximum size of each of the coding blocks which is a unit to be processed at a time when a prediction process is carried out, and also determining an upper limit on the number of hierarchical layers, i.e., a maximum hierarchy depth in a hierarchy in which each of the coding blocks having the maximum size is hierarchically divided into blocks to determine the size of each of the coding blocks. The encoding controlling part 2 also carries out a process of selecting an encoding mode which provides the highest encoding efficiency for each coding block outputted from the block dividing part 1 from one or more available encoding modes (one or more intra encoding modes and one or more inter encoding modes). The encoding controlling part 2 further carries out a process of, when the encoding mode having the highest encoding efficiency is an intra encoding mode, determining intra prediction parameters which are used when carrying out an intra prediction process on the coding block in the intra encoding mode for each prediction block which is a prediction unit, and, when the encoding mode having the highest encoding efficiency is an inter encoding mode, determining inter prediction parameters which are used when carrying out an inter prediction process on the coding block in the inter encoding mode for each prediction block which is a prediction unit. The encoding controlling part 2 further carries out a process of determining a prediction difference encoding parameter which the encoding controlling part provides for a transformation/quantization part 7 and an inverse quantization/inverse transformation part 8. The encoding controlling part 2 constructs an encoding controlling part.

A select switch 3 carries out a process of, when the encoding mode determined by the encoding controlling part 2 is an intra encoding mode, outputting the coding block outputted from the block dividing part 1 to an intra prediction part 4, and, when the encoding mode determined by the encoding controlling part 2 is an inter encoding mode, outputting the coding block outputted from the block dividing part 1 to a motion-compensated prediction part 5.

The intra prediction part 4 carries out a process of performing an intra prediction process (intra-frame prediction process) on each prediction block, which is a prediction unit, in the coding block outputted from the select switch 3 by using the intra prediction parameters determined by the encoding controlling part 2 to generate an intra prediction image while referring to a local decoded image which is stored in a memory 10 for intra prediction. When the intra-frame prediction process at the time of generating a prediction image is a horizontal one, the intra prediction part 4 adds a value proportional to a change in a horizontal direction of the luminance values of pixels adjacent to the top of the prediction block to the luminance value of a pixel adjacent to the left of the prediction block to determine the result of the addition as a predicted value of the prediction image, whereas when the intra-frame prediction process at the time of generating a prediction image is a vertical one, the intra prediction part 4 adds a value proportional to a change in a vertical direction of the luminance values of pixels adjacent to the left of the prediction block to the luminance value of the pixel adjacent to the top of the prediction block to determine the result of the addition as a predicted value of the prediction image. An intra prediction unit is comprised of the intra prediction part 4 and the memory 10 for intra prediction.

The motion-compensated prediction part 5 carries out a process of comparing the coding block outputted from the select switch 3 with a local decoded image of one or more frames stored in a motion-compensated prediction frame memory 12 for each prediction block unit which is a prediction unit to search for a motion vector, and carrying out an inter prediction process (motion-compensated prediction process) on each prediction block in the coding block by using both the motion vector and the inter prediction parameters determined by the encoding controlling part 2 to generate an inter prediction image.

A subtracting part 6 carries out a process of subtracting the intra prediction image generated by the intra prediction part 4 or the inter prediction image generated by the motion-compensated prediction part 5 from the coding block outputted from the block dividing part 1 to output a prediction difference signal (difference image) which is the result of the subtraction to a transformation/quantization part 7. The transformation/quantization part 7 carries out a process of carrying out an orthogonal transformation process (e.g., a DCT (discrete cosine transform) or an orthogonal transformation process, such as a KL transform, in which bases are designed for a specific learning sequence in advance) on the prediction difference signal outputted from the subtracting part 6 by referring to the prediction difference encoding parameter determined by the encoding controlling part 2 to calculate transform coefficients, and also quantizing the transform coefficients by referring to the prediction difference encoding parameter and then outputting compressed data which are the transform coefficients quantized thereby to an inverse quantization/inverse transformation part 8 and a variable length encoding part 13. A quantizing unit is comprised of the subtracting part 6 and the transformation/quantization part 7.

The inverse quantization/inverse transformation part 8 carries out a process of inverse-quantizing the compressed data outputted from the transformation/quantization part 7 by referring to the prediction difference encoding parameter determined by the encoding controlling part 2, and also carrying out an inverse orthogonal transformation process on the transform coefficients which are the compressed data inverse-quantized thereby by referring to the prediction difference encoding parameter to calculate a local decoded prediction difference signal corresponding to the prediction difference signal outputted from the subtracting part 6. An adding part 9 carries out a process of adding the local decoded prediction difference signal calculated by the inverse quantization/inverse transformation part 8 and the intra prediction image generated by the intra prediction part 4 or the inter prediction image generated by the motion-compensated prediction part 5 to calculate a local decoded image corresponding to the coding block outputted from the block dividing part 1.

The memory 10 for intra prediction is a recording medium for storing the local decoded image calculated by the adding part 9. A loop filtering part 11 carries out a process of carrying out a predetermined filtering process on the local decoded image calculated by the adding part 9 to output the local decoded image on which the filtering process is carried out. The motion-compensated prediction frame memory 12 is a recording medium for storing the local decoded image on which the filtering process is carried out.

The variable length encoding part 13 carries out a process of variable-length-encoding the compressed data outputted thereto from the transformation/quantization part 7, the output signal of the encoding controlling part 2 (block division information about the division of each largest coding block, the encoding mode, the prediction difference encoding parameter, and the intra prediction parameters or the inter prediction parameters), and the motion vector outputted from the motion-compensated prediction part 5 (when the encoding mode is an inter encoding mode) to generate a bitstream. The variable length encoding part 13 constructs a variable length encoding unit.

Figure 2:
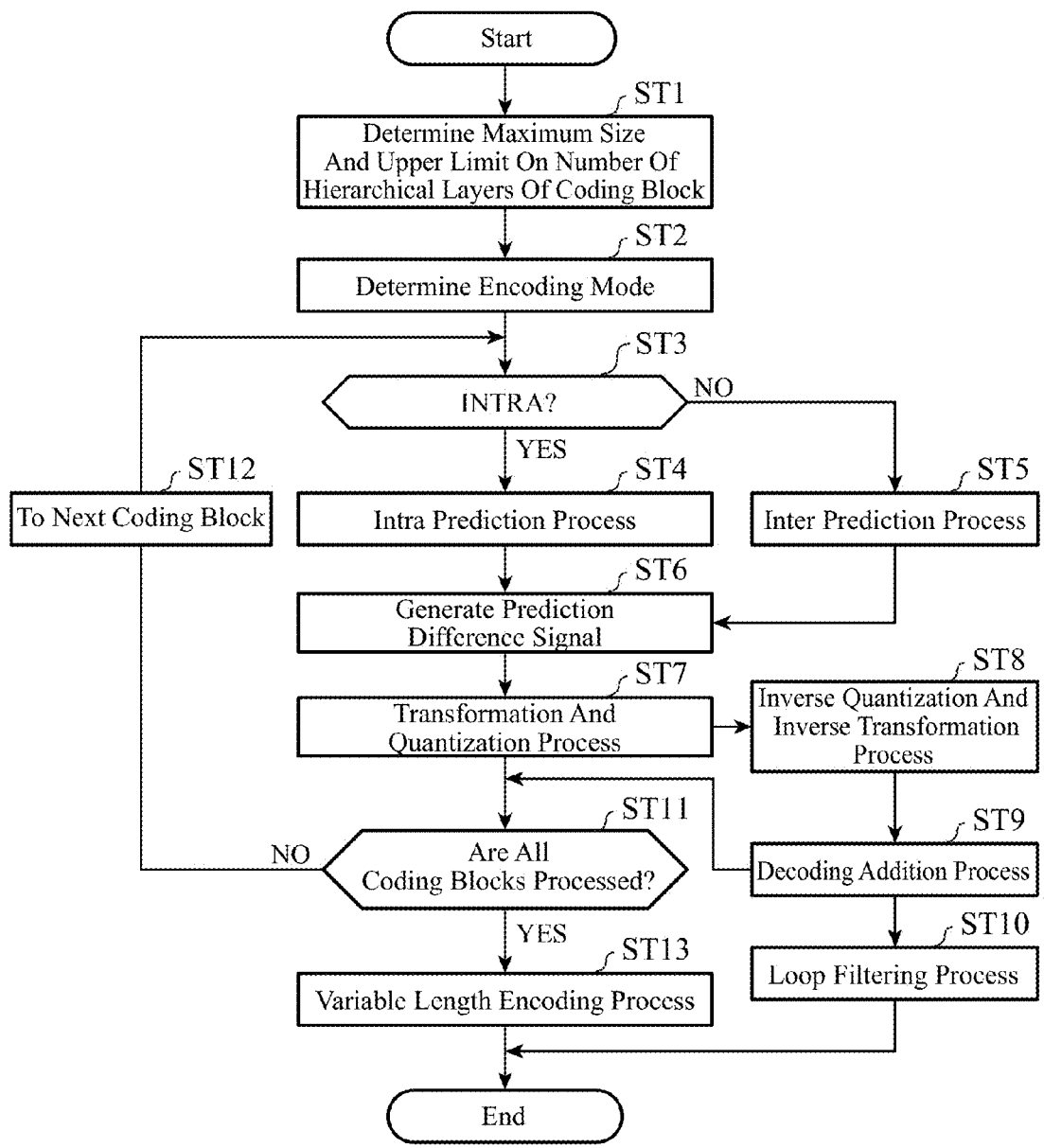
FIG. 2 is a flow chart showing a process (moving image coding method) carried out by the moving image encoding device in accordance with Embodiment 1 of the present invention.

In the example shown in FIG. 1, the block dividing part 1, the encoding controlling part 2, the select switch 3, the intra prediction part 4, the motion-compensated prediction part 5, the subtracting part 6, the transformation/quantization part 7, the inverse quantization/inverse transformation part 8, the adding part 9, the memory 10 for intra prediction, the loop filtering part 11, the motion-compensated prediction frame memory 12, and the variable length encoding part 13, which are the components of the moving image encoding device, can consist of pieces of hardware for exclusive use (e.g., integrated circuits in each of which a CPU is mounted, one chip microcomputers, or the like), respectively. As an alternative, the moving image encoding device can consist of a computer, and a program in which the processes carried out by the block dividing part 1, the encoding controlling part 2, the select switch 3, the intra prediction part 4, the motion-compensated prediction part 5, the subtracting part 6, the transformation/quantization part 7, the inverse quantization/inverse transformation part 8, the adding part 9, the loop filtering part 11, and the variable length encoding part 13 are described can be stored in a memory of the computer and the CPU of the computer can be made to execute the program stored in the memory. FIG. 2 is a flow chart showing the processing (moving image encoding method) carried out by the moving image encoding device in accordance with Embodiment 1 of the present invention.

Figure 3:
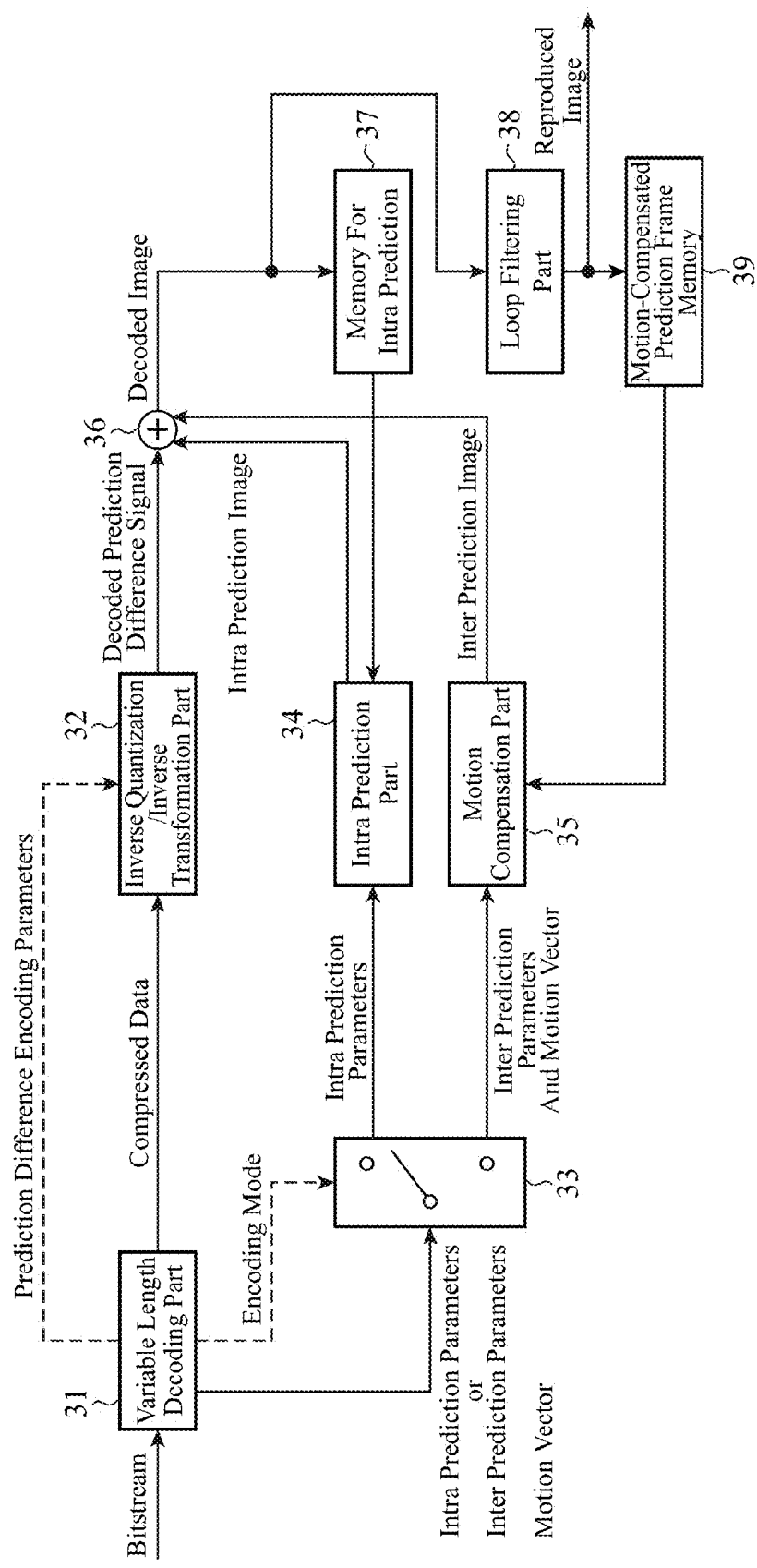
FIG. 3 is a block diagram showing a moving image decoding device in accordance with Embodiment 1 of the present invention.

FIG. 3 is a block diagram showing the moving image decoding device in accordance with Embodiment 1 of the present invention. Referring to FIG. 3, a variable length decoding part 31 carries out a process of, when receiving the bitstream generated by the moving image encoding device shown in FIG. 1, variable-length-decoding the bitstream to acquire the compressed data, the block division information, the encoding mode, the intra prediction parameters (when the encoding mode is an intra encoding mode), the inter prediction parameters (when the encoding mode is an inter encoding mode), the prediction difference encoding parameter, and the motion vector (when the encoding mode is an inter encoding mode). The variable length decoding part 31 constructs a variable length decoding unit.

An inverse quantization/inverse transformation part 32 carries out a process of inverse-quantizing the compressed data variable-length-decoded by the variable length decoding part 31 by referring to the prediction difference encoding parameter variable-length-decoded by the variable length decoding part 31, and also carrying out an inverse orthogonal transformation process on the transform coefficients which are the compressed data inverse-quantized thereby by referring to the prediction difference encoding parameter to calculate a decoded prediction difference signal which is the same as the local decoded prediction difference signal outputted from the inverse quantization/inverse transformation part 8 shown in FIG. 1. The inverse quantization/inverse transformation part 32 constructs an inverse quantizing unit.

A select switch 33 carries out a process of, when the encoding mode variable-length-decoded by the variable length decoding part 31 is an intra encoding mode, outputting the intra prediction parameters variable-length-decoded by the variable length decoding part 31 to an intra prediction part 34, and, when the encoding mode variable-length-decoded by the variable length decoding part 31 is an inter encoding mode, outputting the inter prediction parameters and the motion vector which are variable-length-decoded by the variable length decoding part 31 to a motion compensation part 35.

The intra prediction part 34 carries out a process of carrying out an intra prediction process (intra-frame prediction process) using the intra prediction parameters outputted from the select switch 33 on each prediction block, which is a unit for prediction process, in a decoding block which is specified from the block division information and the encoding mode which are variable-length-decoded by the variable length decoding part 31 (block corresponding to a "coding block" in the moving image encoding device shown in FIG. 1) to generate an intra prediction image while referring to a decoded image which is stored in a memory 37 for intra prediction. When the intra-frame prediction process at the time of generating a prediction image is a horizontal one, the intra prediction part 4 adds a value proportional to a change in a horizontal direction of the luminance values of pixels adjacent to the top of the prediction block to the luminance value of a pixel adjacent to the left of the prediction block to determine the result of the addition as a predicted value of the prediction image, whereas when the intra-frame prediction process at the time of generating a prediction image is a vertical one, the intra prediction part 4 adds a value proportional to a change in a vertical direction of the luminance values of pixels adjacent to the left of the prediction block to the luminance value of the pixel adjacent to the top of the prediction block to determine the result of the addition as a predicted value of the prediction image. An intra prediction unit is comprised of the intra prediction part 34 and the memory 37 for intra prediction.

The motion compensation part 35 carries out a process of carrying out an inter prediction process (motion-compensated prediction process) using the motion vector and the inter prediction parameters which are outputted from the select switch 33 on each prediction block, which is a prediction unit, in the decoding block specified from the block division information and the encoding mode which are variable-length-decoded by the variable length decoding part 31 while referring to a decoded image stored in a motion-compensated prediction frame memory 39 to generate an inter prediction image. An adding part 36 carries out a process of adding the decoded prediction difference signal calculated by the inverse quantization/inverse transformation part 32 and the intra prediction image generated by the intra prediction part 34 or the inter prediction image generated by the motion compensation part 35 to calculate the same decoded image as the local decoded image outputted from the adding part 9 shown in FIG. 1.

The memory 37 for intra prediction is a recording medium for storing the decoded image calculated by the adding part 36. A loop filtering part 38 carries out a process of carrying out a predetermined filtering process on the decoded image calculated by the adding part 36 to output the decoded image on which the filtering process is carried out. The motion-compensated prediction frame memory 39 is a recording medium for storing the decoded image on which the filtering process is carried out.

Figure 4:
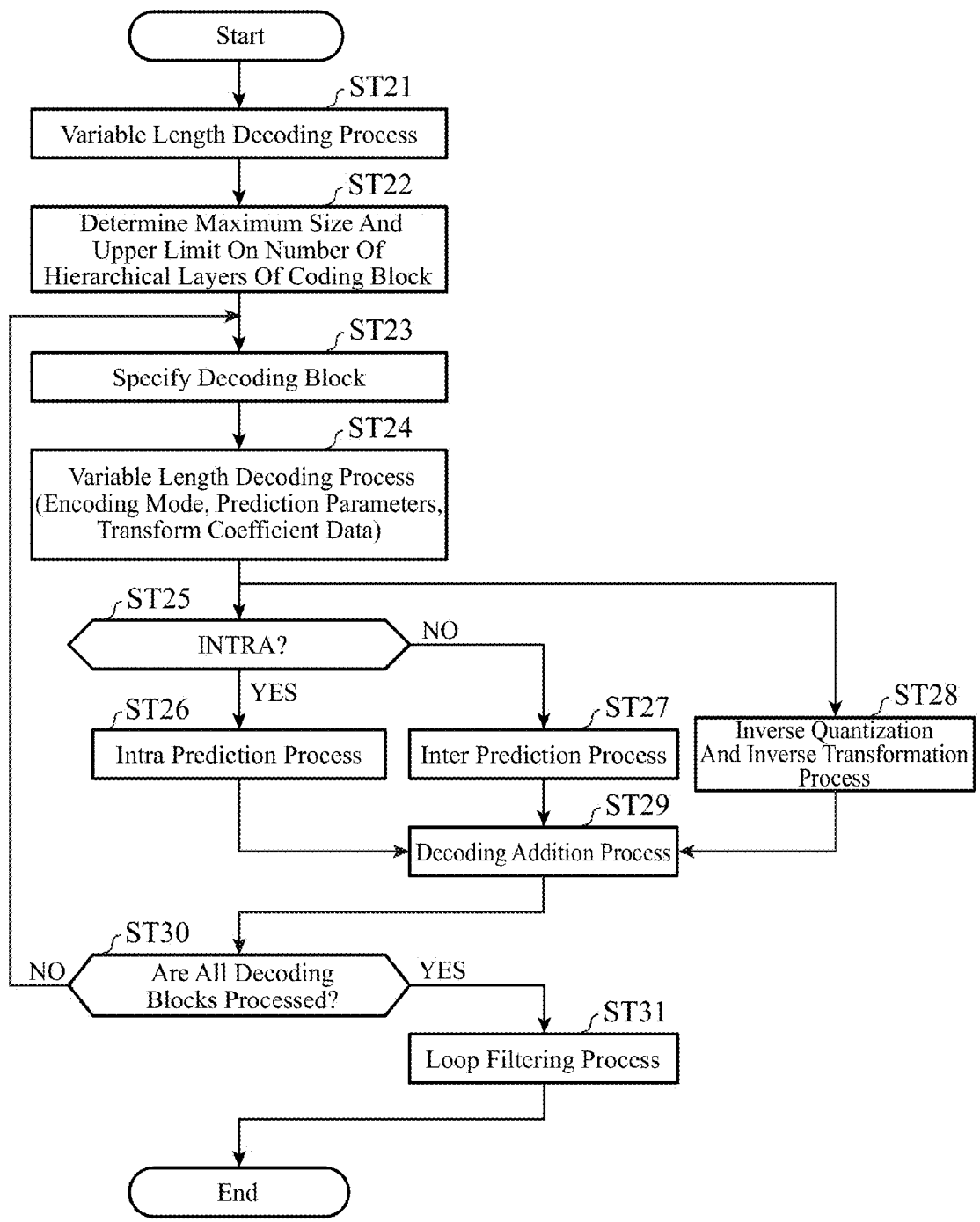
FIG. 4 is a flow chart showing a process (moving image decoding method) carried out by the moving image decoding device in accordance with Embodiment 1 of the present invention.

In the example shown in FIG. 3, the variable length decoding part 31, the inverse quantization/inverse transformation part 32, the select switch 33, the intra prediction part 34, the motion compensation part 35, the adding part 36, the memory 37 for intra prediction, the loop filtering part 38, and the motion-compensated prediction frame memory 39, which are the components of the moving image decoding device, can consist of pieces of hardware for exclusive use (e.g., integrated circuits in each of which a CPU is mounted, one chip microcomputers, or the like), respectively. As an alternative, the moving image decoding device can consist of a computer, and a program in which the processes carried out by the variable length decoding part 31, the inverse quantization/inverse transformation part 32, the select switch 33, the intra prediction part 34, the motion compensation part 35, the adding part 36, and the loop filtering part 38 are described can be stored in a memory of the computer and the CPU of the computer can be made to execute the program stored in the memory. FIG. 4 is a flow chart showing the processing (moving image decoding method) carried out by the moving image decoding device in accordance with Embodiment 1 of the present invention.

Next, the operation of the moving image encoding device and the operation of the moving image decoding device will be explained. In this Embodiment 1, a case in which the moving image encoding device receives each frame image of a video image as an inputted image, carries out either an intra prediction from already-encoded adjacent pixels or a motion-compensated prediction between adjacent frames, carries out a compression process according to orthogonal transformation and quantization on a prediction difference signal acquired thereby, and, after that, carries out variable length encoding to generate a bitstream, and the moving image decoding device decodes the bitstream outputted from the moving image encoding device will be explained.

The moving image encoding device shown in FIG. 1 is characterized in that the moving image encoding device is adapted for local changes of a video signal in a space direction and in a time direction, divides the video signal into blocks having various sizes, and carries out intra-frame and inter-frame adaptive encoding. In general, the video signal has a characteristic of its complexity locally varying in space and time. There can be a case in which a pattern having a uniform signal characteristic in a relatively large image region, such as a sky image or a wall image, or a pattern having a complicated texture pattern in a small image region, such as a person image or a picture including a fine texture, also coexists on a certain video frame from the viewpoint of space. Also from the viewpoint of time, a relatively large image region, such as a sky image or a wall image, has a small local change in a time direction in its pattern, while an image of a moving person or object has a larger temporal change because its outline has a movement of a rigid body and a movement of a non-rigid body with respect to time.

Although a process of generating a prediction difference signal having small signal power and small entropy by using a temporal and spatial prediction, thereby reducing the whole code amount, is carried out in the encoding process, the code amount of parameters used for the prediction can be reduced as long as the parameters can be applied uniformly to as large an image signal region as possible. On the other hand, because the amount of errors occurring in the prediction increases when the same prediction parameter is applied to a large image region in an image signal pattern having a large change in time and space, the code amount of the prediction difference signal increases. Therefore, it is desirable to apply the same prediction parameter to an image region having a large change in time and space to reduce the block size of a block which is subjected to the prediction process, thereby increasing the data volume of the parameter which is used for the prediction and reducing the electric power and entropy of the prediction difference signal.

In this Embodiment 1, a structure of, in order to carry out encoding which is adapted for such the typical characteristics of a video signal, starting the prediction process and so on from a predetermined maximum block size first, hierarchically dividing the region of the video signal into blocks, and adapting the prediction process and the encoding process of encoding the prediction difference to each of the divided blocks is provided.

A video signal having a format which is to be processed by the moving image encoding device of FIG. 1 can be a YUV signal which consists of a luminance signal and two color difference signals or a color video image signal in arbitrary color space, such as an RGB signal, outputted from a digital image sensor, a monochrome image signal or an infrared image signal, or an arbitrary video signal in which each video frame consists of a series of digital samples (pixels) in two dimensions, horizontal and vertical. The gradation of each pixel can be a 8-bit, 10-bit, or 12-bit one.

In the following explanation, for convenience' sake, a case in which the video signal of the inputted image is a YUV signal unless otherwise specified, and the two color difference components U and V which are signals having a 4:2:0 format which are subsampled with respect to the luminance component Y are handled will be described. Further, a data unit to be processed which corresponds to each frame of the video signal is referred to as a "picture." In this Embodiment 1, although an explanation will be made in which a "picture" is a video frame signal on which progressive scanning is carried out, a "picture" can be alternatively a field image signal which is a unit which constructs a video frame when the video signal is an interlaced signal.

First, the processing carried out by the moving image encoding device shown in FIG. 1 will be explained. First, the encoding controlling part 2 determines the size of each largest coding block which is used for the encoding of a picture (current picture) which is the target to be encoded, and an upper limit on the number of hierarchical layers into which each largest coding block is divided (step ST1 of FIG. 2). As a method of determining the size of each largest coding block, for example, there are a method of determining the same size for all the pictures according to the resolution of the video signal of the inputted image, and a method of quantifying a variation in the complexity of a local movement of the video signal of the inputted image as a parameter and then determining a small size for a picture having a large and vigorous movement while determining a large size for a picture having a small movement. As a method of determining the upper limit on the number of hierarchical layers, for example, there can be a method of determining the same depth of the hierarchy for all the pictures according to the resolution of the video signal of the inputted image, and a method of increasing the depth of the hierarchy, i.e., the number of hierarchical layers to make it possible to detect a finer movement as the video signal of the inputted image has a larger and more vigorous movement, or decreasing the depth of the hierarchy, i.e., the number of hierarchical layers as the video signal of the inputted image has a smaller movement.

The encoding controlling part 2 also selects an encoding mode corresponding to each of the coding blocks divided into which the inputted image is hierarchically divided from one or more available encoding modes (step ST2). More specifically, the encoding controlling part 2 hierarchically divides each image region having the largest encoding block size into coding blocks each having an encoding block size until the number of hierarchical layers reaches the upper limit on the number of hierarchical layers, i.e., the maximum hierarchy depth which is determined in advance, and determines an encoding mode for each of the coding blocks. The encoding mode can be one of one or more intra encoding modes (generically referred to as "INTRA") or one or more inter encoding modes (generically referred to as "INTER"), and the encoding controlling part 2 selects an encoding mode corresponding to each of the coding blocks from among all the encoding modes available in the picture currently being processed or a subset of these encoding modes.

Each of the coding blocks into which the inputted image is hierarchically divided by the block dividing part 1, which will be mentioned below, is further divided into one or more prediction blocks each of which is a unit on which a prediction process is to be carried out, and the state of the division into the one or more prediction blocks is also included as information in the encoding mode information. Although a detailed explanation of the selection method of selecting an encoding mode for use in the encoding controlling part 2 will be omitted because the selection method is a known technique, there is a method of carrying out an encoding process on each coding block by using an arbitrary available encoding mode to examine the encoding efficiency and select an encoding mode having the highest level of encoding efficiency from among a plurality of available encoding modes, for example.

The encoding controlling part 2 further determines a quantization parameter and a transformation block size which are used when a difference image is compressed for each coding block, and also determines prediction parameters (intra prediction parameters or inter prediction parameters) which are used when a prediction process is carried out. When each coding block is further divided into prediction blocks on each of which a prediction process is carried out, the encoding controlling part can select prediction parameters (intra prediction parameters or inter prediction parameter) for each of the prediction blocks. In addition, because when an intra prediction process is carried out on each prediction block in a coding block whose encoding mode is an intra encoding mode, already-encoded pixels adjacent to the prediction block are used, it is necessary to carry out encoding on a per prediction block basis, and therefore selectable transformation block sizes are limited to the size of the prediction block or less. The encoding controlling part 2 outputs prediction difference encoding parameters including the quantization parameter and the transformation block size to the transformation/quantization part 7, the inverse quantization/inverse transformation part 8, and the variable length encoding part 13. The encoding controlling part 2 also outputs the intra prediction parameters to the intra prediction part 4 as needed. The encoding controlling part 2 further outputs the inter prediction parameters to the motion-compensated prediction part 5 as needed. When receiving the video signal of the inputted image, the block dividing part 1 divides the video signal of the inputted image into coding blocks each having the largest encoding block size determined by the encoding controlling part 2, and further divides each of the largest coding blocks, into which the inputted image is divided, into coding blocks hierarchically, these coding blocks being determined by the encoding controlling part 2, and outputs each of the coding blocks.

Figure 5:
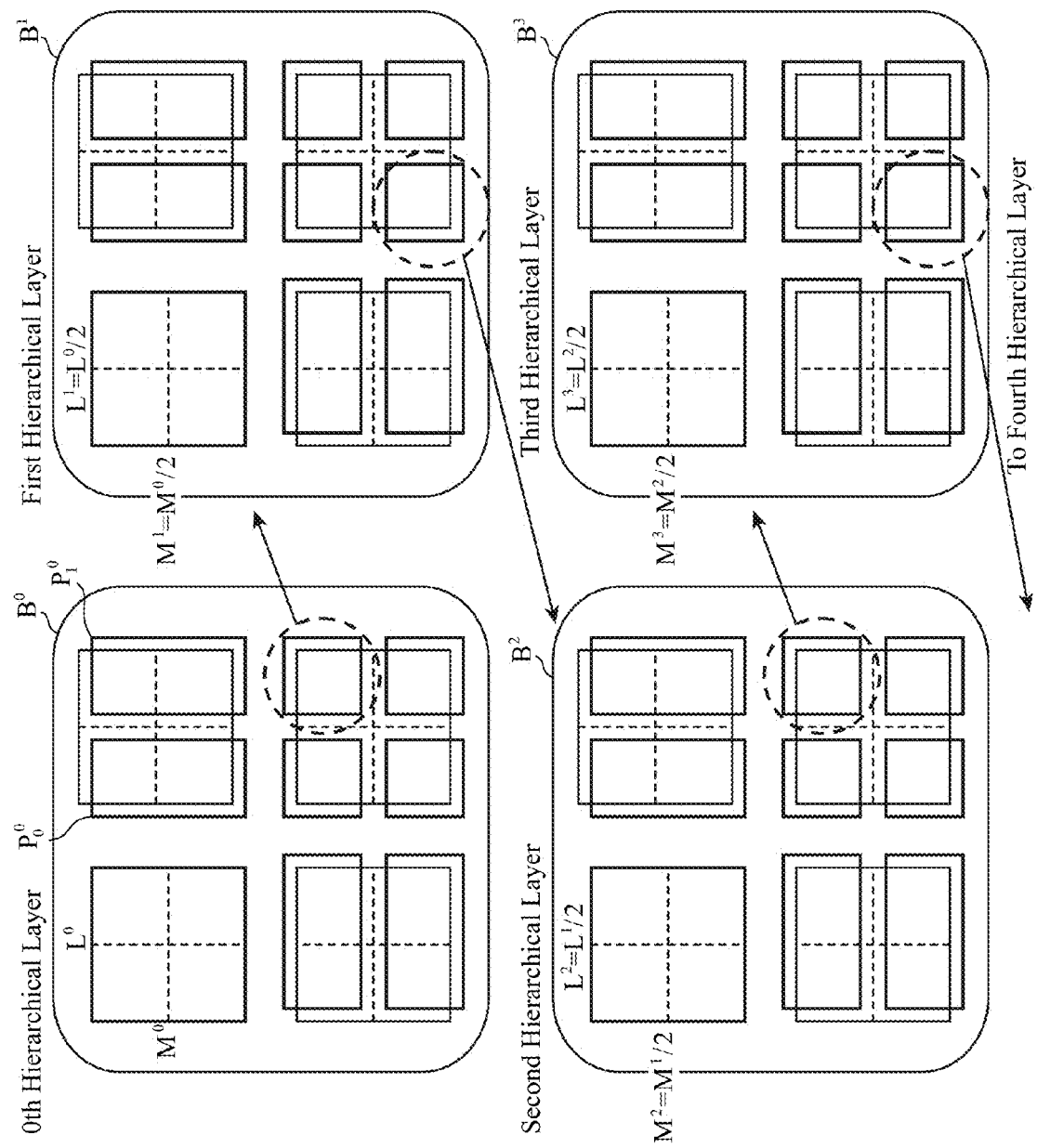
FIG. 5 is an explanatory drawing showing an example in which each largest coding block is divided hierarchically into a plurality of coding blocks.

FIG. 5 is an explanatory drawing showing an example in which each largest coding block is hierarchically divided into a plurality of coding blocks. Referring to FIG. 5, each largest coding block is a coding block whose luminance component, which is shown by "0-th hierarchical layer", has a size of $(L^0, M^0)$. By carrying out the hierarchical division with this largest coding block being set as a starting point until the depth of the hierarchy reaches a predetermined depth which is set separately according to a quadtree structure, the coding blocks can be acquired. At the depth of n, each coding block is an image region having a size of $(L^n, M^n)$. In this example, although $L^n$ can be the same as or differ from $M^n$, the case of $L^n = M^n$ is shown in FIG. 5.

Hereafter, the encoding block size determined by the encoding controlling part 2 is defined as the size of $(L^n, M^n)$ in the luminance component of each coding block. Because a quadtree division is carried out, $(L^{n+1}, M^{n+1}) = (L^n/2, M^n/2)$ is always established. In the case of a color video image signal (4:4:4 format) in which all the color components have the same sample number, such as an RGB signal, all the color components have a size of $(L^n, M^n)$, while in the case of handling a 4:2:0 format, a corresponding color difference component has an encoding block size of $(L^n/2, M^n/2)$.

Hereafter, each coding block in the n-th hierarchical layer is expressed as $B^n$, and an encoding mode selectable for each coding block $B^n$ is expressed as $m(B^n)$. In the case of a color video signal which consists of a plurality of color components, the encoding mode $m(B^n)$ can be configured in such a way that an individual mode is used for each color component, or can be configured in such a way that a common mode is used for all the color components. Hereafter, an explanation will be made by assuming that the encoding mode indicates the one for the luminance component of the coding block when having a 4:2:0 format in a YUV signal unless otherwise specified.

Figure 6:
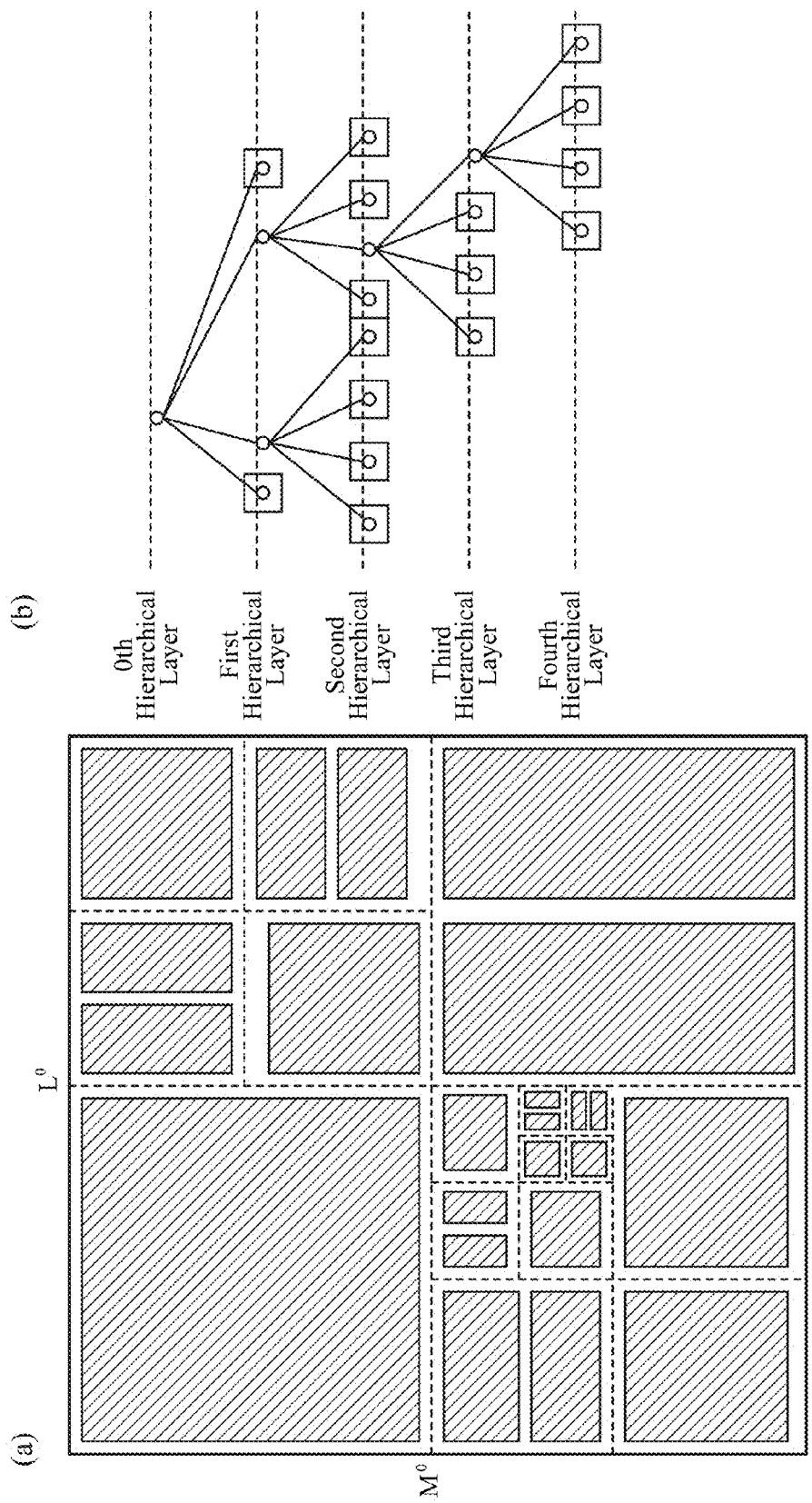
FIG. 6($a$) is an explanatory drawing showing a distribution of coding blocks and prediction blocks into which an image is divided, and FIG. 6($b$) is an explanatory drawing showing a state in which an encoding mode m($B^n$) is assigned to each of the blocks through a hierarchical layer division.

Each coding block $B^n$ is divided into one or more prediction blocks each showing a prediction unit by the block dividing part 1, as shown in FIG. 6. Hereafter, each prediction block belonging to each coding block $B^n$ is expressed as $P_i^n$ (i shows a prediction block number in the n-th hierarchical layer). An example of P00 and P10 is shown in FIG. 5. How the division of each coding block $B^n$ into prediction blocks is carried out is included as information in the encoding mode $m(B^n)$. While a prediction process is carried out on each of all the prediction blocks $P_i^n$ according to the encoding mode $m(B^n)$, individual prediction parameters (intra prediction parameters or inter prediction parameters) can be selected for each prediction block $P_i^n$.

The encoding controlling part 2 generates such a block division state as shown in FIG. 6 for each largest coding block, and then specifies coding blocks. Each rectangle enclosed by a dotted line of FIG. 6(*a*) shows a coding block, and each block filled with hatch lines in each coding block shows the division state of each prediction block. FIG. 6(*b*) shows a situation where an encoding mode $m(B^n)$ is assigned to each node through the hierarchical layer division in the example of FIG. 6(*a*) is shown by using a quadtree graph. Each node enclosed by □ shown in FIG. 6(*b*) is the one (coding block) to which an encoding mode $m(B^n)$ is assigned. Information about this quadtree graph is outputted from the encoding controlling part 2 to the variable length encoding part 13 together with the encoding mode $m(B^n)$, and is multiplexed into the bitstream.

When the encoding mode $m(B^n)$ determined by the encoding controlling part 2 is an intra encoding mode (in the case of $m(B^n) \in INTRA$), the select switch 3 outputs the coding block $B^n$ outputted from the block dividing part 1 to the intra prediction part 4. In contrast, when the encoding mode $m(B^n)$ determined by the encoding controlling part 2 is an inter encoding mode (in the case of $m(B^n) \in INTER$), the select switch 3 outputs the coding block $B^n$ outputted from the block dividing part 1 to the motion-compensated prediction part 5.

When the encoding mode $m(B^n)$ determined by the encoding controlling part 2 is an intra encoding mode (in the case of $m(B^n) \in INTRA$), and the intra prediction part 4 receives the coding block $B^n$ from the select switch 3 (step ST3), the intra prediction part 4 carries out the intra prediction process on each prediction block $P_i^n$ in the coding block $B^n$ by using the intra prediction parameters determined by the encoding controlling part 2 while referring to the local decoded image stored in the memory 10 for intra prediction to generate an intra prediction image $P_{INTRAi}^n$ (step ST4). Because the moving image decoding device needs to generate an intra prediction image which is completely the same as the intra prediction image $P_{INTRAi}^n$, the intra prediction parameters used for the generation of the intra prediction image $P_{INTRAi}^n$ are outputted from the encoding controlling part 2 to the variable length encoding part 13, and are multiplexed into the bitstream. The details of the processing carried out by the intra prediction part 4 will be mentioned below.

When the encoding mode $m(B^n)$ determined by the encoding controlling part 2 is an inter encoding mode (in the case of $m(B^n) \in$ INTER), and the motion-compensated prediction part 5 receives the coding block $B^n$ from the select switch 3 (step ST3), the motion-compensated prediction part 5 compares each prediction block $P_i^n$ in the coding block $B^n$ with the local decoded image on which the filtering process is performed and which is stored in the motion-compensated prediction frame memory 12 to search for a motion vector, and carries out the inter prediction process on each prediction block $P_i^n$ in the coding block $B^n$ by using both the motion vector and the inter prediction parameters determined by the encoding controlling part 2 to generate an inter prediction image $P_{INTERi}^n$ (step ST5). Because the moving image decoding device needs to generate an inter prediction image which is completely the same as the inter prediction image $P_{INTERi}^n$, the inter prediction parameters used for the generation of the inter prediction image $P_{INTERi}^n$ are outputted from the encoding controlling part 2 to the variable length encoding part 13, and are multiplexed into the bitstream. The motion vector which is searched for by the motion-compensated prediction part 5 is also outputted to the variable length encoding part 13 and is multiplexed into the bitstream.

When receiving the coding block $B^n$ from the block dividing part 1, the subtracting part 6 subtracts the intra prediction image $P_{INTRAi}^n$ generated by the intra prediction part 4 or the inter prediction image $P_{INTERi}^n$ generated by the motion-compensated prediction part 5 from the prediction block $P_i^n$ of the coding block $B^n$, and outputs a prediction difference signal $e_i^n$ which is the result of the subtraction to the transformation/quantization part 7 (step ST6).

When receiving the prediction difference signal $e_i^n$ from the subtracting part 6, the transformation/quantization part 7 carries out an orthogonal transformation process (e.g., a DCT (discrete cosine transform) or an orthogonal transformation process, such as a KL transform, in which bases are designed for a specific learning sequence in advance) on the prediction difference signal $e_i^n$ by referring to the prediction difference encoding parameters determined by the encoding controlling part 2 to calculate transform coefficients. The transformation/quantization part 7 also quantizes the transform coefficients by referring to the prediction difference encoding parameters and then outputs compressed data which are the transform coefficients quantized thereby to the inverse quantization/inverse transformation part 8 and the variable length encoding part 13 (step ST7).

When receiving the compressed data from the transformation/quantization part 7, the inverse quantization/inverse transformation part 8 inverse-quantizes the compressed data by referring to the prediction difference encoding parameters determined by the encoding controlling part 2. The inverse quantization/inverse transformation part 8 also carries out an inverse orthogonal transformation processes (e.g., an inverse DCT or an inverse KL transform) on transform coefficients which are the compressed data inverse-quantized by referring to the prediction difference encoding parameters, and calculates a local decoded prediction difference signal corresponding to the prediction difference signal $e_i^n$ outputted from the subtracting part 6 and outputs the local decoded prediction difference signal to the adding part 9 (step ST8).

When receiving the local decoded prediction difference signal from the inverse quantization/inverse transformation part 8, the adding part 9 calculates a local decoded image by adding the local decoded prediction difference signal and either the intra prediction image $P_{INTRAi}^n$ generated by the intra prediction part 4 or the inter prediction image $P_{INTERi}^n$ generated by the motion-compensated prediction part 5 (step ST9). The adding part 9 outputs the local decoded image to the loop filtering part 11 while storing the local decoded image in the memory 10 for intra prediction. This local decoded image is an encoded image signal which is used at the time of subsequent intra prediction processes.

When receiving the local decoded image from the adding part 9, the loop filtering part 11 carries out the predetermined filtering process on the local decoded image, and stores the local decoded image on which the loop filtering part carries out the filtering process in the motion-compensated prediction frame memory 12 (step ST10). The filtering process by the loop filtering part 11 can be carried out on each largest coding block of the local decoded image inputted thereto or each coding block of the local decoded image inputted thereto. As an alternative, after one picture of local decoded images is inputted, the loop filtering part can carry out the filtering process on the picture of local decoded images at a time. As examples of the predetermined filtering process, there can be provided a process of filtering a block boundary between coding blocks in such a way that the discontinuity (block noise) at the boundary does not come into prominence, a filtering process of compensating for a distortion occurring in the local decoded image in such a way that an error between the video signal shown in FIG. 1 which is the inputted image and the local decoded image is minimized, and so on. Because the loop filtering part 11 needs to refer to the video signal when carrying out the filtering process of compensating for a distortion occurring in the local decoded image in such a way that an error between the video signal shown in FIG. 1 which is the inputted image and the local decoded image is minimized, there is a necessity to modify the moving image encoding device shown in FIG. 1 in such a way that the video signal is inputted to the loop filtering part 11.

The moving image encoding device repeatedly carries out the processes of steps ST3 to ST9 until the moving image encoding device completes the processing on all the coding blocks $B^n$ into which the inputted image is divided hierarchically, and, when completing the processing on all the coding blocks $B^n$, shifts to a process of step ST13 (steps ST11 and ST12).

The variable length encoding part 13 entropy-encodes the compressed data outputted thereto from the transformation/quantization part 7, the block division information about the division of each largest coding block into blocks, which is outputted from the encoding controlling part 2 (the quadtree information which is shown in FIG. 6(*b*) as an example), the encoding mode $m(B^n)$ and the prediction difference encoding parameters, the intra prediction parameters (when the encoding mode is an intra encoding mode) or the inter prediction parameters (when the encoding mode is an inter encoding mode) outputted from the encoding controlling part 2, and the motion vector outputted from the motion-compensated prediction part 5 (when the encoding mode is an inter encoding mode), and generates a bitstream showing those encoded results (step ST13).

Figure 7:
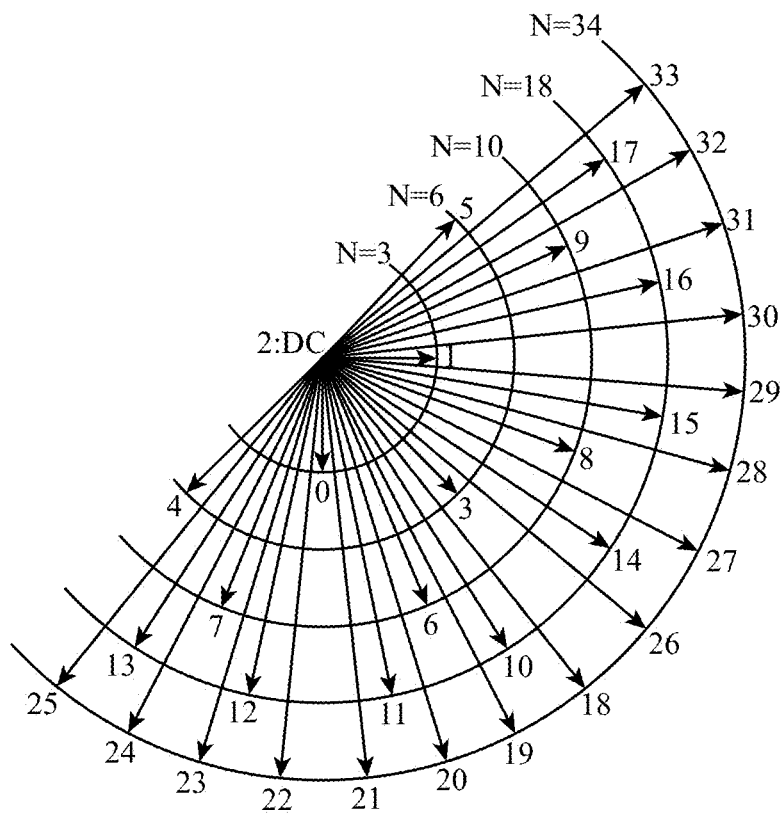
FIG. 7 is an explanatory drawing showing an example of intra prediction parameters (intra prediction mode) which can be selected for each prediction block $P_i^n$ in a coding block $B^n$.

Next, the processing carried out by the intra prediction part 4 will be explained in detail. FIG. 7 is an explanatory drawing showing an example of the intra prediction parameters (intra prediction mode) which can be selected for each prediction block $P_i^n$ in the coding block $B^n$. In FIG. 7, intra prediction modes and prediction direction vectors represented by each of the intra prediction modes are shown. In the example of FIG. 7, it is designed that a relative angle between prediction direction vectors becomes small with increase in the number of selectable intra prediction modes.

The intra prediction part 4 carries out the intra prediction process on each prediction block $P_i^n$ by referring to the intra prediction parameters of the prediction block $P_i^n$ to generate an intra prediction image $P_{INTRAi}^n$, as mentioned above. Hereafter, an intra process of generating an intra prediction signal of a prediction block $P_i^n$ in the luminance signal will be explained.

Figure 8:
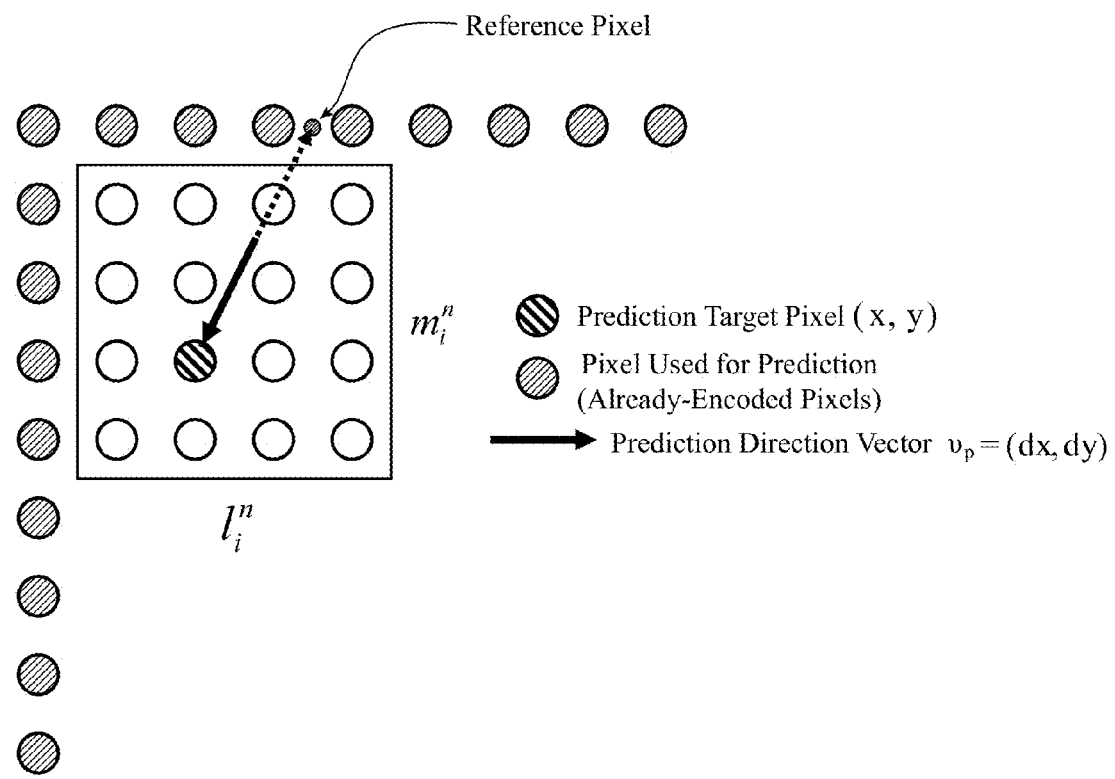
FIG. 8 is an explanatory drawing showing an example of pixels which are used when generating a predicted value of each pixel in a prediction block $P_i^n$ in the case of $l_i^n = m_i^n = 4$.

It is assumed that the size of the prediction block $P_i^n$ is $l_i^n \times m_i^n$ pixels. FIG. 8 is an explanatory drawing showing an example of pixels which are used when generating a predicted value of each pixel in the prediction block $P_i^n$ in the case of $l_i^n = m_i^n = 4$. Although $(2 \times l_i^n + 1)$ already-encoded pixels located above the prediction block $P_i^n$ and $(2 \times m_i^n)$ already-encoded pixels located to the left of the prediction block $P_i^n$ are set as the pixels used for prediction in the example of FIG. 8, a larger or smaller number of pixels than the pixels shown in FIG. 8 can be used for prediction. Further, although one row or column of pixels adjacent to the prediction block $P_i^n$ are used for prediction in the example shown in FIG. 8, two or more rows or columns of pixels adjacent to the prediction block $P_i^n$ can be alternatively used for prediction.

When the index value showing the intra prediction mode for the prediction block $P_i^n$ is 0 (vertical prediction), the intra prediction part calculates a predicted value of each pixel in the prediction block $P_i^n$ according to the following equation (1) to generate a prediction image.

$$S'(x,y) = S(x,-1) + (S(-1,y) - S(-1,-1))/t \quad (1)$$

where the coordinates (x, y) are relative coordinates which are determined with the pixel at the upper left corner of the prediction block $P_i^n$ being defined as the point of origin (refer to FIG. 9), and S' (x, y) is the predicted value at the coordinates (x, y) and S(x, y) is the luminance value (decoded luminance value) of the already-encoded pixel at the coordinates (x, y).

Figure 10:
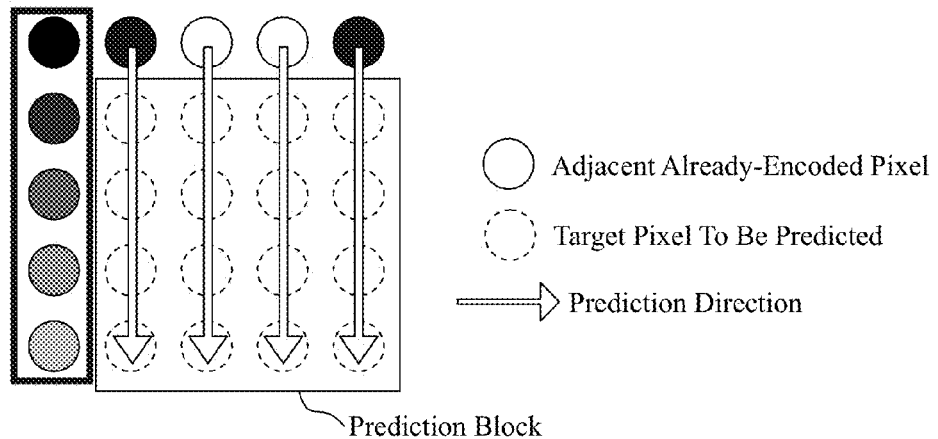
FIG. 10 is an explanatory drawing showing an example of adjacent pixels in another prediction block on the left side of the prediction block, which are to be referred to in order to calculate luminance value changes each of which is to be added to a conventional predicted value calculated using a vertical prediction.

By thus adding a value proportional to (S(−1, y)−S(−1, −1)) showing the amount of change in a vertical direction of the luminance values of already-encoded pixels (pixels enclosed by a thick-bordered box shown in FIG. 10) adjacent to the left of the prediction block $P_i^n$ (i.e., a value which is obtained by scaling (S(−1, y)−S(−1, −1)) showing the amount of change in the vertical direction of the luminance values of the already-encoded pixels by a factor of 1/t) to the luminance value S(x, −1) of an already-encoded pixel adjacent to the top of the prediction block $P_i^n$ which is a predicted value based on a conventional vertical prediction (MPEG-4 AVC/H.264) to determine the addition result as a predicted value of the prediction image, a vertical prediction which follows any change of the luminance value in the prediction direction can be implemented. At that time, when the above-mentioned predicted value does not fall within a range of values which the luminance value can have, the above-mentioned predicted value is rounded down or up in such a way as to fall within the range.

Figure 11:
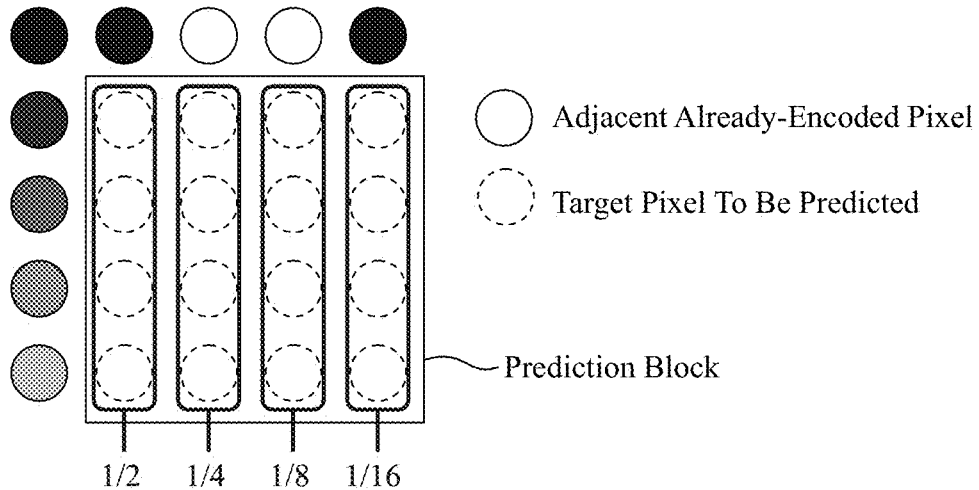
FIG. 11 is an explanatory drawing showing an example of scaling values of the luminance value changes each of which is to be added to the conventional predicted value calculated using a vertical prediction.

The above-mentioned factor of 1/t can be a fixed value or a variable that varies with the coordinates (x, y). For example, because the scaling values starting from the one for the pixels in the left end column decrease as follows: ½, ¼, ⅛, and 1/16 when $t = 2^{x+1}$, as shown in FIG. 11, the amount of change in the vertical direction of the luminance values to be added decreases with distance from the already-encoded pixels adjacent to the left of the prediction block $P_i^n$. As a result, because the longer distance from the already-encoded pixels adjacent to the left of the prediction block $P_i^n$, and hence the lower correlation with the already-encoded pixels the target pixel to be predicted has, the less influence of the already-encoded pixels adjacent to the left of the prediction block $P_i^n$ can be exerted on the target pixel to be predicted, a high-accuracy prediction according to the correlation with the already-encoded pixels adjacent to the left of the prediction block $P_i^n$ can be carried out. In addition, the block size of the prediction block $P_i^n$ on which the prediction process based on the equation (1) is carried out can be limited. In general, a block having a larger block size has various signal changes therein more easily, and there are few cases in which the prediction process on such a block can be carried out using a directional prediction with a high degree of accuracy. Therefore, for example, the equation (1) is not applied to any prediction block $P_i^n$ having a block size of 16×16 pixels or more and a predicted value based on a conventional vertical prediction (the luminance value S(x, −1) of an already-encoded pixel adjacent to the top of the prediction block $P_i^n$) is set as a predicted value of the prediction image, while the equation (1) is applied only to blocks each having a size smaller than 16×16 pixels, thereby being able to suppress the increase in the amount of computation while improving the prediction performance as compared with the case of using the conventional vertical prediction.

Further, when the index value showing the intra prediction mode for the prediction block $P_i^n$ is 1 (horizontal prediction), the intra prediction part calculates a predicted value of each pixel in the prediction block $P_i^n$ according to the following equation (2) to generate a prediction image.

$$S'(x,y) = S(-1,y) + (S(x,-1) - S(-1,-1))/u \quad (2)$$

where the coordinates (x, y) are relative coordinates which are determined with the pixel at the upper left corner of the prediction block $P_i^n$ being defined as the point of origin (refer to FIG. 9), and S' (x, y) is the predicted value at the coordinates (x, y) and S(x, y) is the luminance value (decoded luminance value) of the already-encoded pixel at the coordinates (x, y).

Figure 12:
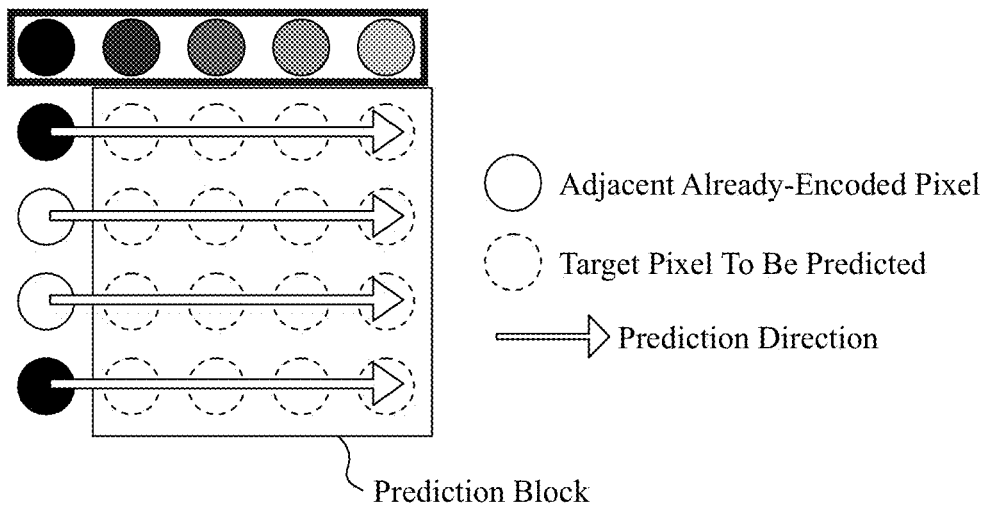
FIG. 12 is an explanatory drawing showing an example of adjacent pixels in another prediction block on the upper side of the prediction block, which are to be referred to in order to calculate luminance value changes each of which is to be added to a conventional predicted value calculated using a horizontal prediction.

By thus adding a value proportional to (S(x, −1)−S(−1, −1)) showing the amount of change in a horizontal direction of the luminance values of already-encoded pixels (pixels enclosed by a thick-bordered box shown in FIG. 12) adjacent to the top of the prediction block $P_i^n$ (i.e., a value which is obtained by scaling (S(x, −1)−S(−1, −1)) showing the amount of change in the horizontal direction of the luminance values of already-encoded pixels by a factor of 1/u) to the luminance value S(−1, y) of an already-encoded pixel adjacent to the left of the prediction block $P_i^n$ which is a predicted value based on a conventional horizontal prediction (MPEG-4 AVC/H.264) to determine the addition result as a predicted value of the prediction image, a horizontal prediction which follows any change of the luminance value in the prediction direction can be implemented. At that time, when the above-mentioned predicted value does not fall within the range of values which the luminance value can have, the above-mentioned predicted value is rounded down or up in such a way as to fall within the range.

Figure 13:
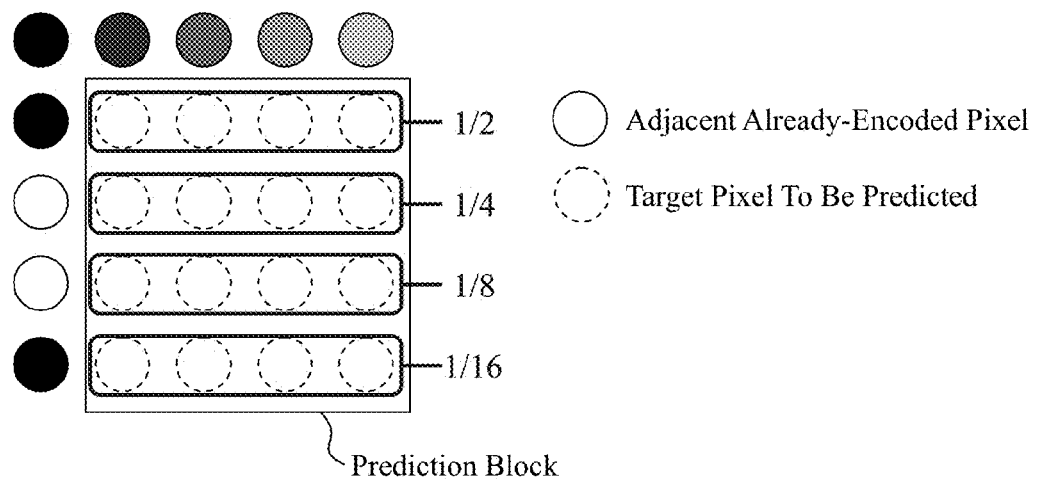
FIG. 13 is an explanatory drawing showing an example of scaling values of the luminance value changes each of which is to be added to the conventional predicted value calculated using a horizontal prediction.
Figure 14:
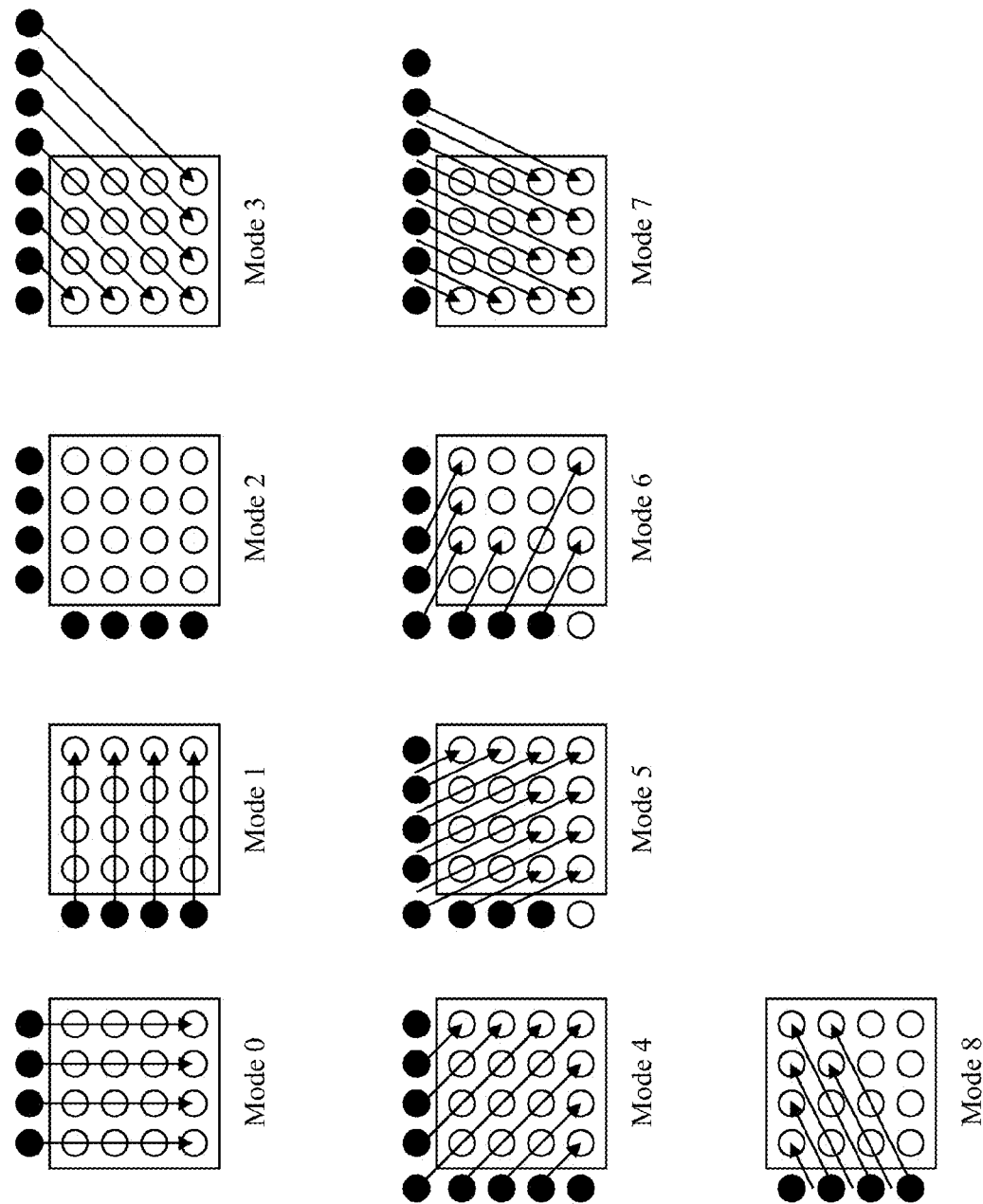
FIG. 14 is an explanatory drawing showing intra prediction modes in the case of a 4×4 pixel block size for luminance.
Figure 16:
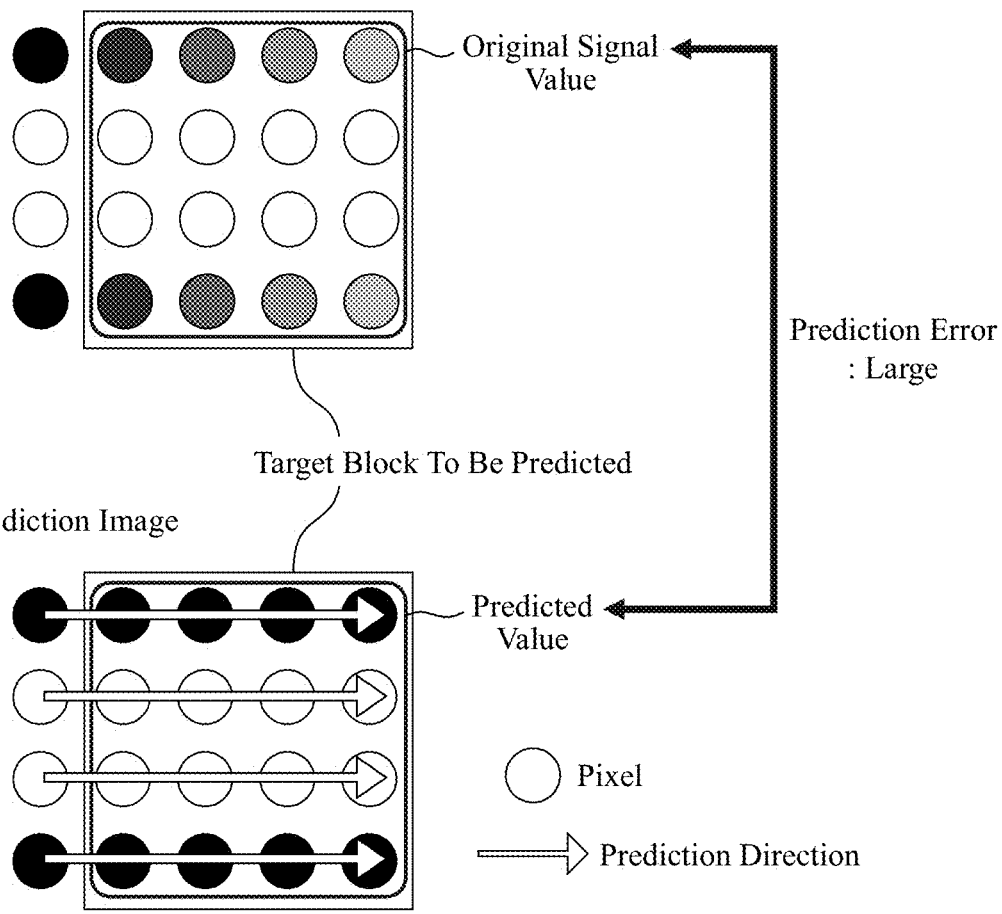
FIG. 16 is an explanatory drawing showing an example in which a large prediction error occurs when a predict process using a horizontal prediction is carried out.

The above-mentioned factor of 1/u can be a fixed value or can be a variable that varies with the coordinates (x, y). For example, because the scaling values starting from the one for the pixels in the upper end row decrease as follows: ½, ¼, ⅛, and 1/16 when $u=2^{y+1}$, as shown in FIG. 13, the amount of change in the horizontal direction of the luminance values to be added decreases with distance from the already-encoded pixels adjacent to the top of the prediction block $P_i^n$. As a result, because the longer distance from the already-encoded pixels adjacent to the top of the prediction block $P_i^n$, and hence the lower correlation with the already-encoded pixels the target pixel to be predicted has, the less influence of the already-encoded pixels adjacent to the top of the prediction block $P_i^n$ can be exerted on the target pixel to be predicted, a high-accuracy prediction according to the correlation with the already-encoded pixels adjacent to the top of the prediction block $P_i^n$ can be carried out. In addition, the block size of the prediction block $P_i^n$ on which the prediction process based on the equation (2) is carried out can be limited. In general, a block having a larger block size has various signal changes therein more easily, and there are few cases in which the prediction process on such a block can be carried out using a directional prediction with a high degree of accuracy. Therefore, for example, the equation (2) is not applied to any prediction block $P_i^n$ having a block size of 16×16 pixels or more and a predicted value based on a conventional horizontal prediction (the luminance value S(−1, y) of an already-encoded pixel adjacent to the left of the prediction block $P_i^n$) is set as a predicted value of the prediction image, while the equation (2) is applied only to blocks each having a size smaller than 16×16 pixels, thereby being able to suppress the increase in the amount of computation while improving the prediction performance as compared with the case of using the conventional horizontal prediction.

Figure 9:
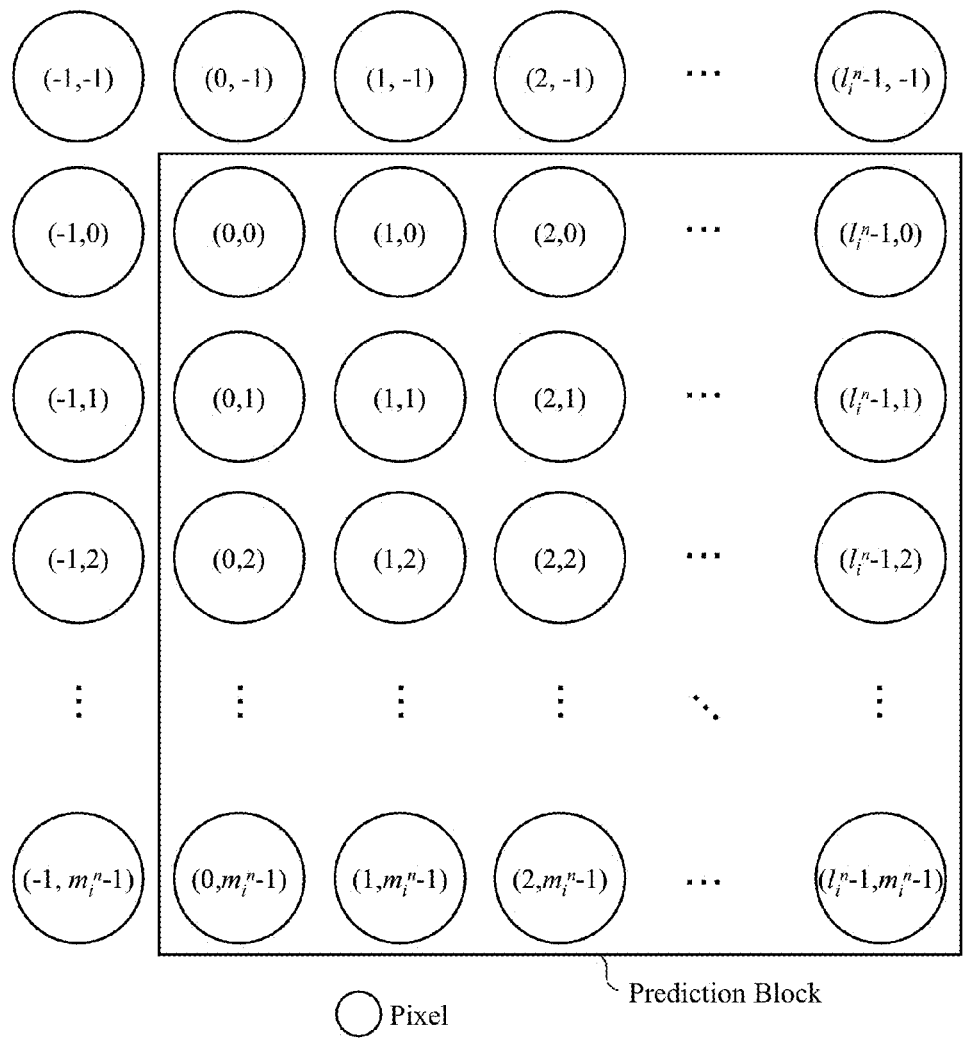
FIG. 9 is an explanatory drawing showing relative coordinates of each pixel in the prediction block $P_i^n$ which are determined with the pixel at the upper left corner of the prediction block $P_i^n$ being defined as the point of origin.

Further, when the index value indicating the intra prediction mode for the prediction block $P_i^n$ is 2 (average prediction), the intra prediction part generates a prediction image by setting the average of the already-encoded pixels adjacent to the top of the prediction block $P_i^n$ and the already-encoded pixels adjacent to the left of the prediction block $P_i^n$ as the predicted value of each pixel in the prediction block $P_i^n$. When the index value indicating the intra prediction mode is other than 0 (vertical prediction), 1 (horizontal prediction), and 2 (average prediction), the intra prediction part generates a predicted value of each pixel in the prediction block $P_i^n$ on the basis of a prediction direction vector $v_p=(dx, dy)$ shown by the index value. As shown in FIG. 9, when the relative coordinates of each pixel in the prediction block $P_i^n$ are expressed as (x, y) with the pixel at the upper left corner of the prediction block $P_i^n$ being defined as the point of origin, each reference pixel which is used for prediction is located at a point of intersection of L shown below and an adjacent pixel.

$$L = \begin{pmatrix} x \\ y \end{pmatrix} + kv_p \quad (3)$$

where k is a negative scalar value.

When a reference pixel is at an integer pixel position, the value of the corresponding integer pixel is determined as the predicted value of the target pixel to be predicted, whereas when a reference pixel is not at an integer pixel position, the value of an interpolation pixel generated from the integer pixels which are adjacent to the reference pixel is determined as the predicted value of the target pixel to be predicted. In the example shown in FIG. 8, because a reference pixel is not located at an integer pixel position, the predicted value is interpolated from the values of two pixels adjacent to the reference pixel. The intra prediction part can use not only the adjacent two pixels but also one or more adjacent pixels to generate an interpolation pixel and determine the value of this interpolation pixel as the predicted value. While the increase in the number of pixels used for the interpolation process provides an advantage of improving the accuracy of computation of an interpolation pixel, because the degree of complexity of computations required for the interpolation process increases with the increase in the number of pixels used for the interpolation process, it is preferable to generate an interpolation pixel from a larger number of pixels in a case in which the moving image encoding device requires high encoding performance even if the arithmetic load is large. According to the same procedure, the intra prediction part generates prediction pixels for all the pixels of the luminance signal in the prediction block $P_i^n$, and outputs an intra prediction image $P_{INTRAi}^n$. The intra prediction parameters used for the generation of the intra prediction image $P_{INTRAi}^n$ are outputted to the variable length encoding part 13 in order to multiplex the intra prediction parameters into the bitstream.

Like in the case of an intra prediction on an 8×8-pixel block in MPEG-4 AVC/H.264 explained previously, as pixels which are used when carrying out an intra prediction, instead of pixels themselves in an already-encoded adjacent block, the pixels on which a filtering process is carried out can be alternatively used.

The intra prediction part also carries out an intra prediction process based on the intra prediction parameters (intra prediction mode) on each of the color difference signals of the prediction block $P_i^n$ according to the same procedure as that according to which the intra prediction part carries out the intra prediction process on the luminance signal, and outputs the intra prediction parameters used for the generation of the intra prediction image to the variable length encoding part 13. The intra prediction parameters (intra prediction mode) selectable for the color difference signals do not need to be the same as those for the luminance signal, and a conventional prediction method (MPEG-4 AVC/H.264) can be used for a vertical prediction and for a horizontal prediction. For example, in the case of a YUV 4:2:0 format, each of the color difference signals (U and V signals) is the one whose resolution is reduced to one-half that of the luminance signal (Y signal) both in a horizontal direction and in a vertical direction, and the complexity of each of the color difference signals is lower than that of the luminance signal and hence a prediction can be carried out on each of the color difference signals more easily than on the luminance signal. Therefore, by reducing the number of selectable intra prediction parameters (intra prediction mode) for each of the color difference signals to be smaller than that for the luminance signal, and using a conventional simple prediction method for each of vertical and horizontal predictions, a reduction in the code amount required to encode the intra prediction parameters (intra prediction mode) and a reduction in the amount of computation required to carry out the prediction process can be implemented without reducing the prediction efficiency too much.

1/t that is the scaling value used for a vertical prediction and 1/u that is the scaling value used for a horizontal prediction can be predetermined between the moving image encoding device and the moving image decoding device. As an alternative, the intra prediction part 4 of the moving image encoding device can output t and u to the variable length encoding part 13 on a per sequence basis or on a per picture basis, the variable length encoding part 13 can variable-length-encode t and u and then include encoded data of t and u in the bitstream, and the moving image decoding device can variable-length-decode the encoded data in the bitstream to acquire t and u, and use t and u. By thus being able to adaptively control t and u on a per sequence basis or on a per picture basis, the moving image encoding device can make the prediction process be more suitable for the characteristics of the video signal of the inputted image.

Further, the block size for which a vertical prediction based on the equation (1) is used and the block size for which a horizontal prediction based on the equation (2) is used can be predetermined between the moving image encoding device and the moving image decoding device. As an alternative, the intra prediction part 4 of the moving image encoding device can output an ON/OFF flag, which is set for each block size, showing whether a vertical prediction based on the equation (1) or a horizontal prediction based on the equation (2) is used for the block size to the variable length encoding part 13 on a per sequence basis or on a per picture basis, the variable length encoding part 13 can variable-length-encode the above-mentioned ON/OFF flag and include encoded data of the ON/OFF flag in the bitstream, and the moving image decoding device can variable-length-decode the encoded data in the bitstream to acquire the above-mentioned ON/OFF flag, and use the above-mentioned ON/OFF flag. By thus being able to adaptively control the block size for which a vertical prediction based on the equation (1) is used and the block size for which a horizontal prediction based on the equation (2) is used on a per sequence basis or on a per picture basis, the moving image encoding device can make the prediction process be more suitable for the characteristics of the video signal of the inputted image.

Next, the processing carried out by the moving image decoding device shown in FIG. 3 will be explained concretely. When receiving the bitstream generated by the moving image encoding device shown in FIG. 1, the variable length decoding part 31 carries out a variable length decoding process on the bitstream (step ST21 of FIG. 4) and decodes the frame size information on a per sequence basis, each sequence consisting of one or more frames of pictures, or on a per picture basis. At this time, when even either one of the parameter t of the scaling value used for a vertical prediction, the parameter u of the scaling value used for a horizontal prediction, and the ON/OFF flag, which is set for each block size, showing whether a vertical prediction based on the equation (1) or a horizontal prediction based on the equation (2) is used for the block size is variable-length-encoded and is multiplexed into the bitstream, the moving image decoding device decodes the encoded data in units of a unit in which the moving image encoding device shown in FIG. 1 carries out the encoding process (on a per sequence basis or on a per picture basis).

The variable length decoding part 31 determines the largest encoding block size and the upper limit on the divided hierarchical layer number which are determined by the encoding controlling part 2 of the moving image encoding device shown in FIG. 1 according to the same procedure as that according to which the moving image encoding device does (step ST22). For example, when the largest encoding block size and the upper limit on the divided hierarchical layer number are determined according to the resolution of the video signal, the variable length decoding part determines the largest encoding block size on the basis of the decoded frame size information and according to the same procedure as that according to which the moving image encoding device does. When the largest encoding block size and the upper limit on the divided hierarchical layer number are multiplexed into the bitstream by the moving image encoding device, the variable length decoding part uses the values decoded from the bitstream. Hereafter, the above-mentioned largest encoding block size is referred to as the largest decoding block size, and a largest coding block is referred to as a largest decoding block in the moving image decoding device. The variable length decoding part 31 decodes the state of division of each largest decoding block as shown in FIG. 6 for each determined largest decoding block. The variable length decoding part hierarchically specifies decoding blocks (i.e., blocks corresponding to the "coding blocks" which are processed by the moving image encoding device shown in FIG. 1) on the basis of the decoded division state (step ST23).

The variable length decoding part 31 then decodes the encoding mode assigned to each decoding block. The variable length decoding part divides each decoding block into one or more prediction blocks each of which is a unit for prediction process on the basis of the information included in the decoded encoding mode, and decodes the prediction parameters assigned to each of the one or more prediction blocks (step ST24).

When the encoding mode assigned to a decoding block is an intra encoding mode, the variable length decoding part 31 decodes the intra prediction parameters for each of the one of more prediction blocks which are included in the decoding block and each of which is a prediction unit. The variable length decoding part 31 further divides the decoding block into one or more transformation blocks each of which is a unit for transformation process on the basis of the transformation block size information included in the prediction difference encoding parameters, and decodes the compressed data (transform coefficients transformed and quantized) about each transformation block (step ST24).

When the encoding mode m(B$^n$) variable-length-decoded by the variable length decoding part 31 is an intra encoding mode (when m(B$^n$)∈INTRA), the select switch 33 outputs the intra prediction parameters of each prediction block unit, which are variable-length-decoded by the variable length decoding part 31, to the intra prediction part 34. In contrast, when the encoding mode m(B$^n$) variable-length-decoded by the variable length decoding part 31 is an inter encoding mode (when m(B$^n$)∈INTER), the select switch outputs the inter prediction parameters and the motion vector of each prediction block unit, which are variable-length-decoded by the variable length decoding part 31, to the motion compensation part 35.

When the encoding mode m(B$^n$) variable-length-decoded by the variable length decoding part 31 is an intra encoding mode (m(B$^n$)∈INTRA) (step ST25), the intra prediction part 34 receives the intra prediction parameters of each prediction block unit outputted from the select switch 33, and carries out an intra prediction process on each prediction block $P_i^n$ in the decoding block B$^n$ using the above-mentioned intra prediction parameters by referring to the decoded image stored in the memory 37 for intra prediction to generate an intra prediction image $P_{INTRAi}^n$ according to the same procedure as that which the intra prediction part 4 shown in FIG. 1 uses (step ST26). More specifically, when the index value showing the intra prediction mode for the prediction block $P_i^n$ is 0 (vertical prediction), the intra prediction part 34 calculates a predicted value of each pixel in the prediction block $P_i^n$ according to the above-mentioned equation (1) to generate an intra prediction image $P_{INTRAi}^n$. Further, when the index value showing the intra prediction mode for the prediction block $P_i^n$ is 1 (horizontal prediction), the intra prediction part 34 calculates a predicted value of each pixel in the prediction block $P_i^n$ according to the above-mentioned equation (2) to generate an intra prediction image $P_{INTRAi}^n$. In this case, when the block size for which a vertical prediction based on the equation (1) or a horizontal prediction based on the equation (2) is used is limited, an intra prediction process based on a conventional vertical or horizontal prediction (MPEG-4 AVC/H.264) is carried out on the prediction block $P_i^n$ when the prediction block $P_i^n$ has a size other than the block size for which a vertical prediction based on the equation (1) or a horizontal prediction based on the equation (2) is used.

When the encoding mode m(B″) variable-length-decoded by the variable length decoding part 31 is an inter encoding mode (m(B″)∈INTER) (step ST25), the motion compensation part 35 receives the motion vector and the inter prediction parameters of each prediction block unit which are outputted from the select switch 33, and carries out an inter prediction process on each prediction block $P_i^n$ in the decoding block using the above-mentioned motion vector and the above-mentioned inter prediction parameters while referring to the decoded image which is stored in the motion-compensated prediction frame memory 39 and on which the filtering process is carried out to generate an inter prediction image $P_{INTERi}^n$ (step ST27).

When receiving the compressed data and the prediction difference encoding parameters from the variable length decoding part 31, the inverse quantization/inverse transformation part 32 inverse-quantizes the compressed data by referring to the prediction difference encoding parameters according to the same procedure as that according to which the inverse quantization/inverse transformation part 8 shown in FIG. 1 does, and also carries out an inverse orthogonal transformation process on the transform coefficients which are the compressed data which the inverse quantization/inverse transformation unit inverse-quantizes by referring to the prediction difference encoding parameters to calculate a decoded prediction difference signal which is the same as the local decoded prediction difference signal outputted from the inverse quantization/inverse transformation part 8 shown in FIG. 1 (step ST28).

The adding part 36 adds the decoded prediction difference signal calculated by the inverse quantization/inverse transformation part 32 and either the intra prediction image $P_{INTRAi}^n$ generated by the intra prediction part 34 or the inter prediction image $P_{INTERi}^n$ generated by the motion compensation part 35 to calculate a decoded image and output this decoded image to the loop filtering part 38, and also stores the decoded image in the memory 37 for intra prediction (step ST29). This decoded image is a decoded image signal which is used at the time of subsequent intra prediction processes.

When completing the processes of steps ST23 to ST29 on all the decoding blocks B″ (step ST30), the loop filtering part 38 carries out a predetermined filtering process on the decoded image outputted from the adding part 36, and stores the decoded image on which the loop filtering part carries out the filtering process in the motion-compensated prediction frame memory 39 (step ST31). The filtering process by the loop filtering part 38 can be carried out on each largest decoding block of the decoded image inputted thereto or each decoding block of the decoded image inputted thereto. As an alternative, after one picture of decoded images is inputted, the loop filtering part can carry out the filtering process on the picture of decoded images at a time. As examples of the predetermined filtering process, there can be provided a process of filtering a block boundary between coding blocks in such a way that the discontinuity (block noise) at the boundary does not come into prominence, a filtering process of compensating for a distortion occurring in the decoded image, and so on. This decoded image is a reference image for motion-compensated prediction, and is also a reproduced image.

As can be seen from the above description, the intra prediction part 4 of the moving image encoding device according to this Embodiment 1 is constructed in such a way as to, when the intra-frame prediction process at the time of generating a prediction image is a horizontal one, adding a value proportional to a change in a horizontal direction of the luminance values of pixels adjacent to the top of the prediction block to the luminance value of a pixel adjacent to the left of the prediction block to determine the result of the addition as a predicted value of the prediction image, whereas when the intra-frame prediction process at the time of generating a prediction image is a vertical one, adding a value proportional to a change in a vertical direction of the luminance values of pixels adjacent to the left of the prediction block to the luminance value of the pixel adjacent to the top of the prediction block to determine the result of the addition as a predicted value of the prediction image. Therefore, there is provided an advantage of being able to implement a high-accuracy prediction, thereby improving the image quality, even when the signal value varies along the prediction direction.

Further, the intra prediction part 34 of the moving image decoding device according to this Embodiment 1 is constructed in such a way as to, when the intra-frame prediction process at the time of generating a prediction image is a horizontal one, adding a value proportional to a change in a horizontal direction of the luminance values of pixels adjacent to the top of a prediction block to the luminance value of a pixel adjacent to the left of the prediction block to determine the result of the addition as a predicted value of the prediction image, whereas when the intra-frame prediction process at the time of generating a prediction image is a vertical one, adding a value proportional to a change in a vertical direction of the luminance values of pixels adjacent to the left of the prediction block to the luminance value of the pixel adjacent to the top of the prediction block to determine the result of the addition as a predicted value of the prediction image. Therefore, there is provided an advantage of being able to implement a high-accuracy prediction, thereby improving the image quality, even when the signal value varies along the prediction direction.

According to this Embodiment 1, because 1/u which is the scaling value used when a horizontal prediction process is carried out by each of the intra prediction parts 4 and 34 is configured in such a way that the scaling value set for each row in the prediction block decreases with distance from the pixels adjacent to the top of the prediction block, the longer distance from the pixels adjacent to the top of the prediction block, and hence the lower correlation with the pixels the target pixel to be predicted has, the less influence of the pixels adjacent to the top of the prediction block can be exerted on the target pixel to be predicted. As a result, there is provided an advantage of being able to carry out the prediction process with a high degree of accuracy. Further, because 1/t which is the scaling value used when a vertical prediction process is carried out by each of the intra prediction parts 4 and 34 is configured in such a way that the scaling value set for each column in the prediction block decreases with distance from the pixels adjacent to the left of the prediction block, the longer distance from the pixels adjacent to the left of the prediction block, and hence the lower correlation with the pixels the target pixel to be predicted has, the less influence of the pixels adjacent to the left of the prediction block can be exerted on the target pixel to be predicted. As a result, there is provided an advantage of being able to carry out the prediction process with a high degree of accuracy.

In this Embodiment 1, the example in which the scaling value set for the N-th row in the prediction block at the time that a horizontal prediction process is carried out by each of the intra prediction parts 4 and 34 is $1/2^{N+1}$ (=½, ¼, ⅛, 1/16, . . . ) and the scaling value set for the M-th column in the prediction block at the time that a vertical prediction process is carried out by each of the intra prediction parts 4 and 34 is $1/2^{M+1}$ (=½, ¼, ⅛, 1/16, . . . ) is shown. This is only an example. The scaling value set for the N-th row in the prediction block can be arbitrary at the time that a horizontal prediction process is carried out by each of the intra prediction parts 4 and 34 as long as the scaling value decreases with distance from the pixels adjacent to the top of the prediction block, and the scaling value set for the M-th column in the prediction block can be arbitrary at the time that a vertical prediction process is carried out by each of the intra prediction parts 4 and 34 as long as the scaling value decreases with distance from the pixels adjacent to the left of the prediction block.

Embodiment 2

In above-mentioned Embodiment 1, the example in which each of the intra prediction parts 4 and 34 is constructed in such a way as to, when the intra-frame prediction process at the time of generating a prediction image is a vertical one, add a change in a vertical direction of the luminance values of pixels adjacent to the left of the prediction block which is multiplied by a scaling value set for each column in the prediction block to the luminance value of the pixel adjacent to the top of the prediction block to determine the result of the addition as a predicted value of the prediction image is shown. In order to implement a prediction process having a low amount of computation, for each of a predetermined number of columns extending vertically, the columns being numbered from the one at the left end of the prediction block, the intra prediction part can add a value proportional to the change in the vertical direction of the luminance values of the pixels adjacent to the left of the prediction block to the luminance value of a pixel adjacent to the top of the prediction block to determine the result of the addition as a predicted value of the prediction image, while for each of remaining columns in the prediction block, the intra prediction part can alternatively determine the luminance value of a pixel adjacent to the top of the prediction block as a predicted value of the prediction image. Further, for the same reason, when the intra-frame prediction process at the time of generating a prediction image is a horizontal one, for each of a predetermined number of rows extending horizontally, the rows being numbered from the one at the upper end of the prediction block, the intra prediction part can add a change in a horizontal direction of the luminance values of pixels adjacent to the top of the prediction block which is multiplied by a scaling value set for each row in the prediction block to the luminance value of a pixel adjacent to the left of the prediction block to determine the result of the addition as a predicted value of the prediction image, while for each of remaining rows in the prediction block, the intra prediction part can alternatively determine the luminance value of a pixel adjacent to the left of the prediction block as a predicted value of the prediction image.

Hereafter, processing carried out by each of intra prediction parts 4 and 34 according to this embodiment will be explained concretely. When an index value indicating an intra prediction mode for a prediction block $P_i^n$ is 0 (vertical prediction), each of the intra prediction parts 4 and 34 calculates a predicted value of each pixel in the prediction block $P_i^n$ to generate a prediction image according to the following equation (4).

$$S'(x, y) = \begin{cases} S(x, -1) + (S(-1, y) - S(-1, -1))/t & (x < B) \\ S(x, -1) & (x \geq B) \end{cases} \quad (4)$$

In this equation, B is an integer equal to or larger than 0, and, when the predicted value calculated exceeds a range of possible values which the luminance value can have at the time of x<B in which the upper part in the equation (4) is applied, the predicted value is rounded down or up in such a way as to fall within the range. The prediction process can be implemented with a lower amount of computation with decrease in the value of B. In the case of B=0, the amount of computation is equal to that in a conventional (MPEG-4 AVC/H.264) vertical prediction using only the luminance value S(x, −1) of an already-encoded (already-decoded) pixel adjacent to the top of the prediction block $P_i^n$. The value of B can be changed according to the block size of the prediction block $P_i^n$. In general, because various signal changes are easy to include in the prediction block and it is difficult to carry out a prediction in a single direction when the block size of the prediction block becomes large, cases in which the value of each pixel in the prediction block can be predicted with a high degree of accuracy by using a directional prediction are reduced in number. Therefore, only when the block size of the prediction block $P_i^n$ is smaller than a predetermined size, B is set in such a way as to satisfy B≥1, whereas when the block size of the prediction block $P_i^n$ is equal to or larger than the predetermined size, B is set to 0. For example, because in a case in which the predetermined size is 16×16 pixels, B is set to 0 when the prediction block $P_i^n$ has a block size of 16×16 pixels or more, the prediction process is the same as a conventional vertical prediction, and therefore increase in the arithmetic processing can be prevented. More specifically, because the condition determination process of determining whether each pixel in the prediction block satisfies x<B or x≥B becomes unnecessary when the prediction block has a block size at B=0, no increase in the arithmetic processing resulting from the conventional vertical prediction process is caused by making the intra prediction part carry out the conventional vertical prediction without carrying out the above-mentioned condition determination process at all times. On the other hand, because B is set to 1 or more when the prediction block $P_i^n$ has a block size smaller than 16×16 pixels, such as 4×4 pixels or 8×8 pixels, the prediction performance can be improved as compared with the case of using a conventional vertical prediction.

For example, when B=1 for a prediction block $P_i^n$ having a block size of 4×4 pixels, the upper part of the equation (4) is applied to the leftmost column in the prediction block $P_i^n$ and a value proportional to the change in the vertical direction of the luminance values of the pixels adjacent to the left of the prediction block is added to the luminance value of a pixel in the leftmost column. On the other hand, the lower part of the equation (4) is applied to each of the second through fourth columns in the prediction block $P_i^n$ and a value proportional to the change in the vertical direction of the luminance values of the pixels adjacent to the left of the prediction block is not added to the luminance value of a pixel in each of the second through fourth columns. By thus setting the value of B to a small one, the increase in the amount of computation can be reduced greatly.

An actual device in which the intra prediction part is embodied can be constructed in such a way as to use the different expressions for the computation of a predicted value, as shown in the above-mentioned equation (4), for each pixel at the position x<B and for each pixel at the position x≥B, or can be constructed arbitrarily as long as the intra prediction part can calculate a predicted value equivalent to that calculated using the above-mentioned equation. For example, an actual device can be constructed in such a way as to copy the luminance value $S(-x, 1)$ of an already-encoded (or already-decoded) pixel adjacent to the top of the prediction block $P_i^n$ which is a predicted value acquired using a conventional vertical prediction for each of all the pixels in the prediction block $P_i^n$, and add a value which is acquired by scaling $(S(-1, y)-S(-1, -1))$ by a factor of 1/t to the luminance value of only each pixel at the position x<B.

Further, when the index value indicating the intra prediction mode for a prediction block $P_i^n$ is 0 (horizontal prediction), each of the intra prediction parts 4 and 34 calculates a predicted value of each pixel in the prediction block $P_i^n$ to generate a prediction image according to the following equation (5).

$$S'(x, y) = \begin{cases} S(-1, y) + (S(x, -1) - S(-1, -1))/t & (y < C) \\ S(-1, y) & (y \geq C) \end{cases} \quad (5)$$

In this equation, C is an integer equal to or larger than 0, and, when the predicted value calculated exceeds a range of possible values which the luminance value can have at the time of x<C in which the upper part in the equation (5) is applied, the predicted value is rounded down or up in such a way as to fall within the range. The prediction process can be implemented with a lower amount of computation with decrease in the value of C. In the case of C=0, the amount of computation is equal to that in a conventional (MPEG-4 AVC/H.264) horizontal prediction using only the luminance value $S(-1, y)$ of an already-encoded (already-decoded) pixel adjacent to the left of the prediction block $P_i^n$. The value of C can be changed according to the block size of the prediction block $P_i^n$. In general, because various signal changes are easy to include in the prediction block and it is difficult to carry out a prediction in a single direction when the block size of the prediction block becomes large, cases in which the value of each pixel in the prediction block can be predicted with a high degree of accuracy by using a directional prediction are reduced in number. Therefore, only when the block size of the prediction block $P_i^n$ is smaller than a predetermined size, C is set in such a way as to satisfy C≥1, whereas when the block size of the prediction block $P_i^n$ is equal to or larger than the predetermined size, C is set to 0. For example, because in a case in which the predetermined size is 16×16 pixels, C is set to 0 when the prediction block $P_i^n$ has a block size of 16×16 pixels or more, the prediction process is the same as a conventional horizontal prediction, and therefore increase in the arithmetic processing can be prevented. More specifically, because the condition determination process of determining whether each pixel in the prediction block satisfies y<C or y≥C becomes unnecessary when the prediction block has a block size at C=0, no increase in the arithmetic processing resulting from the conventional horizontal prediction process is caused by making the intra prediction part carry out the conventional horizontal prediction without carrying out the above-mentioned condition determination process at all times. On the other hand, because C is set to 1 or more when the prediction block $P_i^n$ has a block size smaller than 16×16 pixels, such as 4×4 pixels or 8×8 pixels, the prediction performance can be improved as compared with the case of using the conventional horizontal prediction.

For example, when C=1 for a prediction block $P_i^n$ having a block size of 4×4 pixels, the upper part of the equation (5) is applied to the uppermost row in the prediction block $P_i^n$ and a value proportional to the change in the horizontal direction of the luminance values of the pixels adjacent to the top of the prediction block is added to the luminance value of each pixel in the uppermost row. On the other hand, the lower part of the equation (5) is applied to each of the second through fourth rows in the prediction block $P_i^n$ and a value proportional to the change in the horizontal direction of the luminance values of the pixels adjacent to the top of the prediction block is not added to the luminance value of each pixel in each of the second through fourth columns. By thus setting the value of C to a small one, the increase in the amount of computation can be reduced greatly.

An actual device in which the intra prediction part is embodied can be constructed in such a way as to use the different expressions for the computation of a predicted value, as shown in the above-mentioned equation (5), for each pixel at the position y<C and for each pixel at the position y≥C, or can be constructed arbitrarily as long as the intra prediction part can calculate a predicted value equivalent to that calculated using the above-mentioned equation. For example, an actual device can be constructed in such a way as to copy the luminance value $S(-1, y)$ of an already-encoded (or already-decoded) pixel adjacent to the left of the prediction block $P_i^n$ which is a predicted value acquired using a conventional horizontal prediction for each of all the pixels in the prediction block $P_i^n$, and add a value which is acquired by scaling $(S(x, -1)-S(-1, -1))$ by a factor of 1/u to the luminance value of only each pixel at the position y<C.

1/t that is the scaling value and B which are used for a vertical prediction (intra-block information specifying the columns for each of which the value proportional to the change in the vertical direction of the luminance values of the pixels adjacent to the left of the prediction block is added to the luminance value of a pixel adjacent to the top of the prediction block), and 1/u that is the scaling value and C which are used for a horizontal prediction (intra-block information specifying the rows for each of which the value proportional to the change in the horizontal direction of the luminance values of the pixels adjacent to the top of the prediction block is added to the luminance value of a pixel adjacent to the left of the prediction block) can be predetermined between the moving image encoding device and the moving image decoding device. As an alternative, the intra prediction part 4 of the moving image encoding device can output t, u, B and C to a variable length encoding part 13 on a per sequence basis or on a per picture basis, the variable length encoding part 13 can variable-length-encode t, u, B and C and then include encoded data of t, u, B and C in a bitstream, and the moving image decoding device can variable-length-decode the encoded data in the bitstream to acquire t, u, B and C and use t, u, B and C. By thus being able to adaptively control t, u, B and C on a per sequence basis or on a per picture basis, the moving image encoding device can make the prediction process be more suitable for the characteristics of the video signal of the inputted image.

Further, the block size for which a vertical prediction based on the equation (4) is used and the block size for which a horizontal prediction based on the equation (5) is used can be predetermined between the moving image encoding device and the moving image decoding device. As an alternative, the intra prediction part 4 of the moving image encoding device can output an ON/OFF flag, which is set for each block size, showing whether a vertical prediction based on the equation (4) or a horizontal prediction based on the equation (5) is used for the block size to the variable length encoding part 13 on a per sequence basis or on a per picture basis, the variable length encoding part 13 can variable-length-encode the above-mentioned ON/OFF flag and include encoded data of the ON/OFF flag in the bitstream, and the moving image decoding device can variable-length-decode the encoded data in the bitstream to acquire the above-mentioned ON/OFF flag, and use the above-mentioned ON/OFF flag. By thus being able to adaptively control the block size for which a vertical prediction based on the equation (4) is used and the block size for which a horizontal prediction based on the equation (5) is used on a per sequence basis or on a per picture basis, the moving image encoding device can make the prediction process be more suitable for the characteristics of the video signal of the inputted image.

As can be seen from the above description, each of the intra prediction parts 4 and 34 according to this Embodiment 2 is constructed in such a way as to, when the intra-frame prediction process at the time of generating a prediction image is a horizontal one, for each of a predetermined number of rows extending horizontally, the rows being numbered from the one at the upper end of the prediction block, add a value proportional to a change in the horizontal direction of the luminance values of the pixels adjacent to the top of the prediction block to the luminance value of a pixel adjacent to the left of the prediction block to determine the result of the addition as a predicted value of the prediction image, and, for each of remaining rows in the prediction block, determine the luminance value of a pixel adjacent to the left of the prediction block as a predicted value of the prediction image. Therefore, there is provided an advantage of being able to improve the prediction efficiency of the horizontal prediction while reducing the increase in the amount of computation. Further, each of the intra prediction parts 4 and 34 according to this Embodiment 2 is constructed in such a way as to, when the intra-frame prediction process at the time of generating a prediction image is a vertical one, for each of a predetermined number of columns extending vertically, the columns being numbered from the one at the left end of the prediction block, add a value proportional to a change in the vertical direction of the luminance values of the pixels adjacent to the left of the prediction block to the luminance value of a pixel adjacent to the top of the prediction block to determine the result of the addition as a predicted value of the prediction image, and, for each of remaining columns in the prediction block, determine the luminance value of a pixel adjacent to the top of the prediction block as a predicted value of the prediction image. Therefore, there is provided an advantage of being able to improve the prediction efficiency of the vertical prediction while reducing the increase in the amount of computation.

Embodiment 3

A block diagram showing the structure of a moving image encoding device in accordance with this Embodiment 3 is the same as that of FIG. 1 shown in above-mentioned Embodiment 1, and a block diagram showing the structure of a moving image decoding device in accordance with this Embodiment 3 is the same as that of FIG. 3 shown in above-mentioned Embodiment 1.

Next, the operations of the moving image encoding device and the moving image decoding device will be explained. In this Embodiment 3, a case in which the moving image encoding device receives each frame image of a video as an inputted image, carries out an intra prediction from already-encoded adjacent pixels or a motion-compensated prediction between adjacent frames, and carries out a compression process with an orthogonal transform and quantization on an acquired prediction difference signal, and, after that, carries out variable length encoding to generate a bitstream, and the moving image decoding device decodes the bitstream outputted from the moving image encoding device will be explained.

The moving image encoding device shown in FIG. 1 is characterized in that the moving image encoding device is adapted for local changes of a video signal in a space direction and in a time direction, divides the video signal into blocks having various sizes, and carries out intra-frame and inter-frame adaptive encoding. In general, the video signal has a characteristic of its complexity locally varying in space and time. There can be a case in which a pattern having a uniform signal characteristic in a relatively large image region, such as a sky image or a wall image, or a pattern having a complicated texture pattern in a small image region, such as a person image or a picture including a fine texture, also coexists on a certain video frame from the viewpoint of space. Also from the viewpoint of time, a relatively large image region, such as a sky image or a wall image, has a small local change in a time direction in its pattern, while an image of a moving person or object has a larger temporal change because its outline has a movement of a rigid body and a movement of a non-rigid body with respect to time.

Although in the encoding process a process of generating a prediction difference signal having small signal power and small entropy by using a temporal and spatial prediction, thereby reducing the whole code amount, is carried out, the code amount of a parameter used for the prediction can be reduced as long as the parameter can be applied uniformly to as large an image signal region as possible. On the other hand, because the amount of errors occurring in the prediction increases when the same prediction parameter is applied to a large image region in an image signal pattern having a large change in time and space, the code amount of the prediction difference signal increases. Therefore, it is desirable to apply the same prediction parameter to an image region having a large change in time and space to reduce the block size of a block which is subjected to the prediction process, thereby increasing the data volume of the parameter which is used for the prediction and reducing the electric power and entropy of the prediction difference signal.

In this Embodiment 3, a structure of, in order to carry out encoding which is adapted for such the typical characteristics of a video signal, starting the prediction process and so on from a predetermined maximum block size first, hierarchically dividing the region of the video signal into blocks, and adapting the prediction process and the encoding process of encoding the prediction difference to each of the divided blocks is provided.

A video signal having a format which is to be processed by the moving image encoding device of FIG. 1 can be a YUV signal which consists of a luminance signal and two color difference signals or a color video image signal in arbitrary color space, such as an RGB signal, outputted from a digital image sensor, a monochrome image signal or an infrared image signal, or an arbitrary video signal in which each video frame consists of a series of digital samples (pixels) in two dimensions, horizontal and vertical. The gradation of each pixel can be an 8-bit, 10-bit, or 12-bit one.

In the following explanation, for convenience' sake, the video signal of the inputted image is a YUV signal unless otherwise specified. Further, a case in which signals having a 4:2:0 format which are subsampled are handled as the two color difference components U and V with respect to the luminance component Y will be described. Further, a data unit to be processed which corresponds to each frame of the video signal is referred to as a "picture." In this Embodiment 3, although a "picture" is explained as a video frame signal on which progressive scanning is carried out, a "picture" can be a field image signal which is a unit which constructs a video frame when the video signal is an interlaced signal.

First, the processing carried out by the moving image encoding device shown in FIG. 1 will be explained. First, an encoding controlling part 2 determines the size of each largest coding block which is used for the encoding of a picture (current picture) which is the target to be encoded, and an upper limit on the number of hierarchical layers into which each largest coding block is divided (step ST1 of FIG. 2). As a method of determining the size of each largest coding block, for example, there are a method of determining the same size for all the pictures according to the resolution of the video signal of the inputted image, and a method of quantifying a variation in the complexity of a local movement of the video signal of the inputted image as a parameter and then determining a small size for a picture having a large and vigorous movement while determining a large size for a picture having a small movement. As a method of determining the upper limit on the divided hierarchical layer number, for example, there are a method of determining the same hierarchy depth, i.e., the same number of hierarchical layers for all the pictures according to the resolution of the video signal of the inputted image, and a method of increasing the depth of the hierarchy, i.e., the number of hierarchical layers to make it possible to detect a finer movement when the video signal of the inputted image has a large and vigorous movement, or decreasing the number of hierarchical layers when the video signal of the inputted image has a small movement.

The encoding controlling part 2 also selects an encoding mode corresponding to each of coding blocks into which the inputted image is divided hierarchically from one or more available encoding modes (step ST2). More specifically, the encoding controlling part 2 hierarchically divides each of image regions each having the largest encoding block size into coding blocks each having an encoding block size until the number of hierarchical layers reaches the predetermined upper limit on the divided hierarchical layer number, and determines an encoding mode for each of the coding blocks.

The encoding mode can be one of one or more intra encoding modes (generically referred to as "INTRA") or one or more inter encoding modes (generically referred to as "INTER"), and the encoding controlling part 2 selects an encoding mode corresponding to each of the coding blocks from among all the encoding modes available in the picture currently being processed or a subset of these encoding modes.

Each of the coding blocks into which the inputted image is hierarchically divided is further divided into one or more prediction blocks, each of which is a unit for prediction process, by a block dividing part 1 which will be mentioned below. The state of division of each of the coding blocks into one or more prediction blocks is also included as information in the encoding mode information. Although a detailed explanation of the selection method of selecting an encoding mode for use in the encoding controlling part 2 will be omitted because the selection method is a known technique, there is a method of carrying out an encoding process on the coding block by using an arbitrary available encoding mode to examine the encoding efficiency and select an encoding mode having the highest level of encoding efficiency from among a plurality of available encoding modes, for example.

The encoding controlling part 2 further determines a quantization parameter and a transformation block size which are used when a difference image is compressed for each of the coding blocks, and also determines prediction parameters (intra prediction parameters or inter prediction parameters) which are used when a prediction process is carried out. When each of the coding blocks is further divided into one or more prediction block units on each of which a prediction process is carried out, the encoding controlling part can select prediction parameters (intra prediction parameters or inter prediction parameters) for each prediction block. In addition, in a coding block in which the encoding mode is an intra encoding mode, because already-encoded pixels adjacent to each prediction block are used when an intra prediction process is carried out on the prediction block, as will be mentioned below, the encoding controlling part needs to carry out the encoding on each prediction block. Therefore, the selectable transformation block size is limited to the size of the prediction block or less. The encoding controlling part 2 outputs prediction difference encoding parameters including the quantization parameter and the transformation block size to a transformation/quantization part 7, an inverse quantization/inverse transformation part 8, and a variable length encoding part 13. The encoding controlling part 2 also outputs the intra prediction parameters to an intra prediction part 4 as needed. The encoding controlling part 2 also outputs the inter prediction parameters to a motion-compensated prediction part 5 as needed. When receiving the video signal of the inputted image, the block dividing part 1 divides the video signal of the inputted image into blocks each having the largest encoding block size determined by the encoding controlling part 2, and further divides each of the largest coding blocks, into which the inputted image is divided, hierarchically into coding blocks which are determined by the encoding controlling part 2 and outputs each of the coding blocks.

FIG. 5 is an explanatory drawing showing an example in which each largest coding block is hierarchically divided into a plurality of coding blocks. Referring to FIG. 5, each largest coding block is a coding block whose luminance component, which is shown by "0-th hierarchical layer", has a size of ($L^0$, $M^0$). By carrying out the hierarchical division with this largest coding block being set as a starting point until the depth of the hierarchy reaches a predetermined depth which is set separately according to a quadtree structure, the coding blocks can be acquired. At the depth of n, each coding block is an image region having a size of ($L^n$, $M^n$). In this example, although $M^n$ can be the same as or differ from $L^n$, the case of $L^n=M^n$ is shown in FIG. 5.

Hereafter, the encoding block size determined by the encoding controlling part 2 is defined as the size of ($L^n$, $M^n$) in the luminance component of each coding block. In order to carry out a quadtree division, ($L^{n+1}$, $M^{n+1}$)=($L^n/2$, $M^n/2$) is always established. In the case of a color video image signal (4:4:4 format) in which all the color components have the same sample number, such as an RGB signal, all the color components have a size of ($L^n$, $M^n$), while in the case of handling a 4:2:0 format, a corresponding color difference component has an encoding block size of ($L^n/2$, $M^n/2$).

Hereafter, each coding block in the n-th hierarchical layer is expressed as $B^n$, and an encoding mode selectable for each coding block $B^n$ is expressed as $m(B^n)$. In the case of a color video signal which consists of a plurality of color components, the encoding mode $m(B^n)$ can be configured in such a way that an individual mode is used for each of the color components, or can be configured in such a way that a common mode is used for all the color components. Hereafter, an explanation will be made by assuming that the encoding mode indicates the one for the luminance component of a coding block having a 4:2:0 format in a YUV signal unless otherwise specified.

Each coding block $B^n$ is divided into one or more prediction blocks each showing a prediction unit by the block dividing part 1, as shown in FIG. 6. Hereafter, each prediction block belonging to a coding block $B^n$ is expressed as $P_i^n$ (i shows a prediction block number in the n-th hierarchical layer). An example of P00 and P10 is shown in FIG. 5. How the division of each coding block $B^n$ into one or more prediction blocks is carried out is included as information in the encoding mode $m(B^n)$. While the prediction process is carried out on each of all the prediction blocks $P_i^n$ according to the encoding mode $m(B^n)$, individual prediction parameters (intra prediction parameters or inter prediction parameters) can be selected for each prediction block $P_i^n$.

The encoding controlling part 2 generates such a block division state as shown in FIG. 6 for each largest coding block, and then specifies coding blocks. Each rectangle enclosed by a dotted line shown in FIG. 6(a) shows a coding block, and each block filled with hatch lines in each coding block shows a state of division of a prediction block. FIG. 6(b) shows a situation in which encoding modes $m(B^n)$ are respectively assigned to the prediction blocks in the example of FIG. 6(a) according to the hierarchical layer division by using a quadtree graph. Each node enclosed by ☐ shown in FIG. 6(b) is a node (coding block) to which an encoding mode $m(B^n)$ is assigned. Information about this quadtree graph is outputted from the encoding controlling part 2 to the variable length encoding part 13 together with the encoding mode $m(B^n)$, and is multiplexed into the bitstream.

When the encoding mode $m(B^n)$ determined by the encoding controlling part 2 is an intra encoding mode (in the case of $m(B^n) \in$ INTRA), a select switch 3 outputs the coding block $B^n$ outputted from the block dividing part 1 to the intra prediction part 4. In contrast, when the encoding mode $m(B^n)$ determined by the encoding controlling part 2 is an inter encoding mode (in the case of $m(B^n) \in$ INTER), the select switch outputs the coding block $B^n$ outputted from the block dividing part 1 to the motion-compensated prediction part 5.

When the encoding mode $m(B^n)$ determined by the encoding controlling part 2 is an intra encoding mode (in the case of $m(B^n) \in$ INTRA), and the intra prediction part 4 receives the coding block $B^n$ from the select switch 3 (step ST3), the intra prediction part 4 carries out the intra prediction process on each prediction block $P_i^n$ in the coding block $B^n$ by using the intra prediction parameters determined by the encoding controlling part 2 while referring to a local decoded image stored in a memory 10 for intra prediction to generate an intra prediction image $P_{INTRAi}^n$ (step ST4). Because the moving image decoding device needs to generate an intra prediction image which is completely the same as the intra prediction image $P_{INTRAi}^n$, the intra prediction parameters used for the generation of the intra prediction image $P_{INTRAi}^n$ are outputted from the encoding controlling part 2 to the variable length encoding part 13 and are multiplexed into the bitstream. The details of the processing carried out by the intra prediction part 4 will be mentioned below.

When the encoding mode $m(B^n)$ determined by the encoding controlling part 2 is an inter encoding mode (in the case of $m(B^n) \in$ INTER), and the motion-compensated prediction part 5 receives the coding block $B^n$ from the select switch 3 (step ST3), the motion-compensated prediction part 5 compares each prediction block $P_i^n$ in the coding block $B^n$ with the local decoded image on which the filtering process is performed and which is stored in a motion-compensated prediction frame memory 12 to search for a motion vector, and carries out the inter prediction process on each prediction block $P_i^n$ in the coding block $B^n$ by using both the motion vector and the inter prediction parameters determined by the encoding controlling part 2 to generate an inter prediction image $P_{INTERi}^n$ (step ST5). Because the moving image decoding device needs to generate an inter prediction image which is completely the same as the inter prediction image $P_{INTERi}^n$, the inter prediction parameters used for the generation of the inter prediction image $P_{INTERi}^n$ are outputted from the encoding controlling part 2 to the variable length encoding part 13 and are multiplexed into the bitstream. The motion vector which is searched for by the motion-compensated prediction part 5 is also outputted to the variable length encoding part 13 and is multiplexed into the bitstream.

When receiving the coding block $B^n$ from the block dividing part 1, a subtracting part 6 subtracts the intra prediction image $P_{INTRAi}^n$ generated by the intra prediction part 4 or the inter prediction image $P_{INTERi}^n$ generated by the motion-compensated prediction part 5 from the prediction block $P_i^n$ in the coding block $B^n$, and outputs a prediction difference signal $e_i^n$ showing the result of the subtraction to the transformation/quantization part 7 (step ST6).

When receiving the prediction difference signal $e_i^n$ from the subtracting part 6, the transformation/quantization part 7 carries out an orthogonal transformation process (e.g., a DCT (discrete cosine transform) or an orthogonal transformation process, such as a KL transform, in which bases are designed for a specific learning sequence in advance) on the prediction difference signal $e_i^n$ by referring to the prediction difference encoding parameters determined by the encoding controlling part 2 to calculate transform coefficients. The transformation/quantization part 7 also quantizes the transform coefficients by referring to the prediction difference encoding parameters and then outputs compressed data which are the transform coefficients quantized thereby to the inverse quantization/inverse transformation part 8 and the variable length encoding part 13 (step ST7).

When receiving the compressed data from the transformation/quantization part 7, the inverse quantization/inverse transformation part 8 inverse-quantizes the compressed data by referring to the prediction difference encoding parameters determined by the encoding controlling part 2. The inverse quantization/inverse transformation part 8 also carries out an inverse orthogonal transformation process (e.g., an inverse DCT or an inverse KL transform) on the transform coefficients which are the compressed data inverse-quantized thereby by referring to the prediction difference encoding parameters to calculate a local decoded prediction difference signal corresponding to the prediction difference signal $e_i^n$ outputted from the subtracting part 6 and outputs the local decoded prediction difference signal to an adding part 9 (step ST8).

When receiving the local decoded prediction difference signal from the inverse quantization/inverse transformation part 8, the adding part 9 adds the local decoded prediction difference signal and the intra prediction image $P_{INTRAi}^n$ generated by the intra prediction part 4 or the inter prediction image $P_{INTERi}^n$ generated by the motion-compensated prediction part 5 to calculate a local decoded image (step ST9). The adding part 9 outputs the local decoded image to a loop filtering part 11 while storing the local decoded image in the memory 10 for intra prediction. This local decoded image is an already-encoded image signal which is used at the time of subsequent intra prediction processes.

When receiving the local decoded image from the adding part 9, the loop filtering part 11 carries out a predetermined filtering process on the local decoded image, and stores the local decoded image on which the loop filtering part carries out the filtering process in the motion-compensated prediction frame memory 12 (step ST10). The filtering process by the loop filtering part 11 can be carried out on each largest coding block of the local decoded image inputted or each coding block of the local decoded image inputted. As an alternative, after the local decoded images of one picture are inputted, the filtering process can be carried out on all the local decoded images of the one picture at a time. Further, as examples of the predetermined filtering process, there can be provided a process of filtering a block boundary between coding blocks in such a way that the discontinuity (block noise) at the boundary does not come into prominence, a filtering process of compensating for a distortion occurring in the local decoded image in such a way that an error between the video signal shown in FIG. 1 which is the inputted image and the local decoded image is minimized, and so on. Because the loop filtering part 11 needs to refer to the video signal when carrying out the filtering process of compensating for a distortion occurring in the local decoded image in such a way that an error between the video signal shown in FIG. 1 which is the inputted image and the local decoded image is minimized, there is a necessity to modify the moving image encoding device shown in FIG. 1 in such a way that the video signal is inputted to the loop filtering part 11.

The moving image encoding device repeatedly carries out the processes of steps ST3 to ST9 until the moving image encoding device completes the processing on all the coding blocks $B^n$ into which the inputted image is divided hierarchically, and, when completing the processing on all the coding blocks $B^n$, shifts to a process of step ST13 (steps ST11 and ST12).

The variable length encoding part 13 variable-length-encodes the compressed data outputted from the transformation/quantization part 7, the block division information about the division of each largest coding block (quadtree information as shown in, for example, FIG. 6($b$)), and the encoding mode m($B^n$) and the prediction difference encoding parameters, which are outputted from the encoding controlling part 2, the intra prediction parameters (when the encoding mode is an intra encoding mode) or the inter prediction parameters (when the encoding mode is an inter encoding mode) outputted from the encoding controlling part 2, and the motion vector outputted from the motion-compensated prediction part 5 (when the encoding mode is an inter encoding mode) to generate a bitstream showing the encoded results of those data (step ST13).

Figure 17:
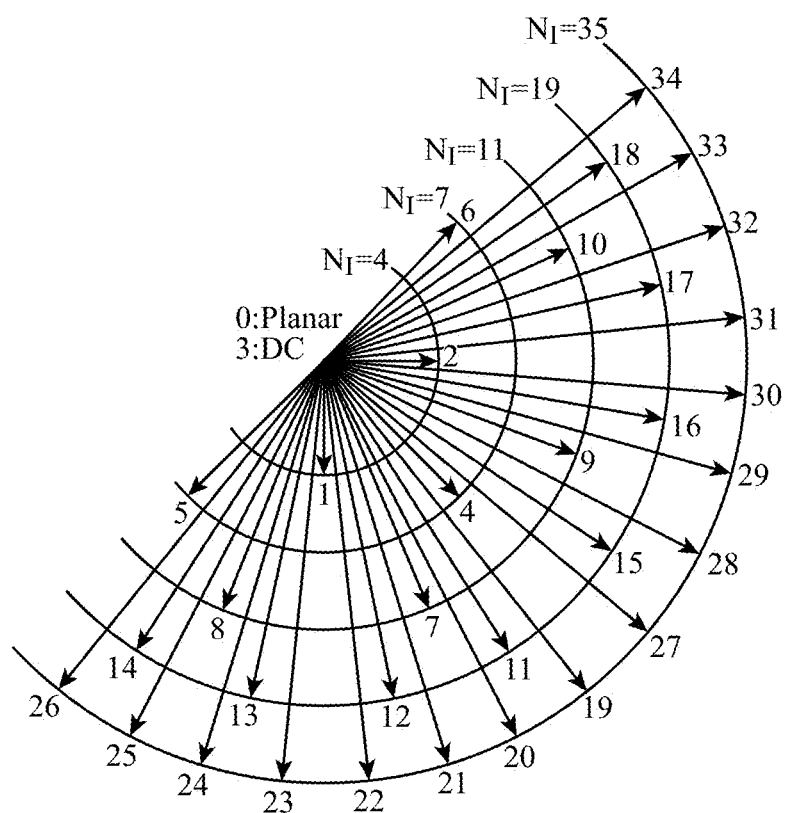
FIG. 17 is an explanatory drawing showing an example of intra prediction parameters (intra prediction mode) each of which can be selected for each prediction block $P_i^n$ in a coding block $B^n$.

Next, the processing carried out by the intra prediction part 4 will be explained in detail. FIG. 17 is an explanatory drawing showing an example of the intra prediction parameters (intra prediction mode) which can be selected for each prediction block $P_i^n$ in the coding block $B^n$. In the figure, $N_I$ shows the number of intra prediction modes. In FIG. 17, intra prediction modes and prediction direction vectors represented by each of the intra prediction modes are shown. In the example of FIG. 17, it is designed that a relative angle between prediction direction vectors becomes small with increase in the number of selectable intra prediction modes.

The intra prediction part 4 carries out the intra prediction process on each prediction block $P_i^n$ by referring to the intra prediction parameters of the prediction block $P_i^n$ to generate an intra prediction image $P_{INTRAi}^n$, as mentioned above. Hereafter, an intra process of generating an intra prediction signal of the prediction block $P_i^n$ in the luminance signal will be explained.

It is assumed that the size of the prediction block $P_i^n$ is $l_i^n \times m_i^n$ pixels. FIG. 8 is an explanatory drawing showing an example of pixels which are used when generating a predicted value of each pixel in the prediction block $P_i^n$ in the case of $l_i^n = m_i^n = 4$. Although ($2 \times l_i^n + 1$) already-encoded pixels located above the prediction block $P_i^n$ and ($2 \times m_i^n$) already-encoded pixels located to the left of the prediction block $P_i^n$ are set as the pixels used for prediction in the example of FIG. 8, a smaller number of pixels than the pixels shown in FIG. 8 can be used for prediction. Although one row or column of pixels which are adjacent to the prediction block $P_i^n$ are used for prediction in the example of FIG. 8, two rows or columns of pixels or three or more rows or columns of pixels can be used for prediction.

When an index value showing the intra prediction mode for the prediction block $P_i^n$ is 0 (planar prediction), the intra prediction part uses already-encoded pixels adjacent to the top of the prediction block $P_i^n$ and already-encoded pixels adjacent to the left of the prediction block $P_i^n$ to acquire a value interpolated according to the distance between the target pixel to be predicted in the prediction block $P_i^n$ and the above-mentioned adjacent pixels as a predicted value and generates a prediction image.

When the index value showing the intra prediction mode for the prediction block $P_i^n$ is 1 (vertical prediction), the intra prediction part calculates a predicted value of each pixel in the prediction block $P_i^n$ according to the following equation (1) to generate a prediction image.

$$S'(x,y) = S(x,-1) + (S(-1,y) - S(-1,-1))/t \qquad (1)$$

where the coordinates (x, y) are relative coordinates which are determined with the pixel at the upper left corner of the prediction block $P_i^n$ being defined as the point of origin (refer to FIG. 9), and S' (x, y) is the predicted value at the coordinates (x, y) and S(x, y) is the luminance value (decoded luminance value) of the already-encoded pixel at the coordinates (x, y).

By thus adding a value proportional to (S(−1, y)−S(−1, −1)) showing the amount of change in a vertical direction of the luminance values of already-encoded pixels (pixels enclosed by a thick-bordered box shown in FIG. 10) adjacent to the left of the prediction block $P_i^n$ (i.e., a value which is obtained by scaling (S(−1, y)−S(−1, −1)) showing the amount of change in the vertical direction of the luminance values of the already-encoded pixels by a factor of 1/t) to the luminance value S(x, −1) of an already-encoded pixel adjacent to the top of the prediction block $P_i^n$ which is a predicted value based on a conventional vertical prediction (MPEG-4 AVC/H.264) to determine the addition result as a predicted value of the prediction image, a vertical prediction which follows any change of the luminance value in the prediction direction can be implemented. At that time, when the above-mentioned predicted value does not fall within a range of values which the luminance value can have, the above-mentioned predicted value can be rounded down or up in such a way as to fall within the range. By doing in this way, although the amount of computation increases slightly by an amount corresponding to the rounding process, the occurrence of a predicted value which does not fall within the range of values which the luminance value can have can be suppressed, and prediction errors can be reduced.

The above-mentioned factor of 1/t can be a fixed value or a variable that varies with the coordinates (x, y). For example, because the scaling values starting from the one for the pixels in the left end column decrease as follows: ½, ¼, ⅛, and ¹⁄₁₆ when $t=2^{x+1}$, as shown in FIG. 11, the amount of change in the vertical direction of the luminance values to be added decreases with distance from the already-encoded pixels adjacent to the left of the prediction block $P_i^n$. As a result, because the longer distance from the already-encoded pixels adjacent to the left of the prediction block $P_i^n$, and hence the lower correlation with the already-encoded pixels the target pixel to be predicted has, the less influence of the already-encoded pixels adjacent to the left of the prediction block $P_i^n$ can be exerted on the target pixel to be predicted, a high-accuracy prediction according to the correlation with the already-encoded pixels adjacent to the left of the prediction block $P_i^n$ can be carried out. Further, in the case of $t=2^{x+1}$, the equation (1) can be expressed by an equation showing a bit shift operation, as will be shown below.

$$S'(x,y)=S(x,-1)+(S(-1,y)-S(-1,-1))\!>\!>(x+1) \qquad (1a)$$

In the equation (1a), ">>a" shows an operation of performing an arithmetic right shift by a bits. The use of the shift operation instead of the division of the equation (1) enables the intra prediction part to carry out high-speed computations in a case in which the intra prediction part is installed on a computer. Because S(−1, y)−S(−1, −1) can have a negative value, ">>" is handled not as an arithmetic shift but as a logical shift, depending upon an implementation environment (compiler) and so on, and the computation result may differ from that acquired from the equation (1). To solve this problem, as an approximate expression of the equation (1) in the case of $t=2^{x+1}$ independent of any implementation environment, the following equation (1b) can be provided.

$$S'(x,y)=S(x,-1)+S(-1,y)\!>\!>(x+1)-S(-1,-1)\!>\!>(x+1) \qquad (1b)$$

In the equation (1b), because a subtraction is carried out after the luminance values S(−1, y) and S(−1, −1) are right shifted by (x+1) bits, respectively, the same computation result can be acquired for both arithmetic shift and logical shift when positive values are defined as the luminance values.

In addition, the block size of the prediction block $P_i^n$ on which the prediction process based on the equation (1) is carried out can be limited. In general, a block having a larger block size has various signal changes therein more easily, and there are few cases in which the prediction process on such a block can be carried out using a directional prediction with a high degree of accuracy. Therefore, for example, the equation (1) is not applied to any prediction block $P_i^n$ having a block size of 16×16 pixels or more and a predicted value based on a conventional vertical prediction (the luminance value S(x, −1) of an already-encoded pixel adjacent to the top of the prediction block $P_i^n$) is set as a predicted value of the prediction image, while the equation (1) is applied only to blocks each having a size smaller than 16×16 pixels, thereby being able to suppress the increase in the amount of computation while improving the prediction performance as compared with the case of using the conventional vertical prediction.

Further, when the index value showing the intra prediction mode for the prediction block $P_i^n$ is 1 (horizontal prediction), the intra prediction part calculates a predicted value of each pixel in the prediction block $P_i^n$ according to the following equation (2) to generate a prediction image.

$$S'(x,y)=S(-1,y)+(S(x,-1)-S(-1,-1))/u \qquad (2)$$

where the coordinates (x, y) are relative coordinates which are determined with the pixel at the upper left corner of the prediction block $P_i^n$ being defined as the point of origin (refer to FIG. 9), and S'(x, y) is the predicted value at the coordinates (x, y) and S(x, y) is the luminance value (decoded luminance value) of the already-encoded pixel at the coordinates (x, y).

By thus adding a value proportional to (S(x, −1)−S(−1, −1)) showing the amount of change in a horizontal direction of the luminance values of already-encoded pixels (pixels enclosed by a thick-bordered box shown in FIG. 12) adjacent to the top of the prediction block $P_i^n$ (i.e., a value which is obtained by scaling (S(x, −1)−S(−1, −1)) showing the amount of change in the horizontal direction of the luminance values of already-encoded pixels by a factor of 1/u) to the luminance value S(−1, y) of an already-encoded pixel adjacent to the left of the prediction block $P_i^n$ which is a predicted value based on a conventional horizontal prediction (MPEG-4 AVC/H.264) to determine the addition result as a predicted value of the prediction image, a horizontal prediction which follows any change of the luminance value in the prediction direction can be implemented. At that time, when the above-mentioned predicted value does not fall within the range of values which the luminance value can have, the above-mentioned predicted value can be rounded down or up in such a way as to fall within the range. By doing in this way, although the amount of computation increases slightly by an amount corresponding to the rounding process, the occurrence of a predicted value which does not fall within the range of values which the luminance value can have can be suppressed, and prediction errors can be reduced.

The above-mentioned factor of 1/u can be a fixed value or can be a variable that varies with the coordinates (x, y). For example, because the scaling values starting from the one for the pixels in the upper end row decrease as follows: ½, ¼, ⅛, and ¹⁄₁₆ when $u=2^{y+1}$, as shown in FIG. 13, the amount of change in the horizontal direction of the luminance values to be added decreases with distance from the already-encoded pixels adjacent to the top of the prediction block $P_i^n$. As a result, because the longer distance from the already-encoded pixels adjacent to the top of the prediction block $P_i^n$, and hence the lower correlation with the already-encoded pixels the target pixel to be predicted has, the less influence of the already-encoded pixels adjacent to the top of the prediction block $P_i^n$ can be exerted on the target pixel to be predicted, a high-accuracy prediction according to the correlation with the already-encoded pixels adjacent to the top of the prediction block $P_i^n$ can be carried out. Further, in the case of $u=2^{y+1}$, the equation (2) can be expressed by an equation showing a bit shift operation, as will be shown below.

$$S'(x,y)=S(-1,y)+(S(x,-1)-S(-1,-1))\!\gg\!(y+1) \quad (2a)$$

In the equation (2a), ">>a" shows an operation of performing an arithmetic right shift by a bits. The use of the shift operation instead of the division of the equation (2) enables the intra prediction part to carry out high-speed computations in a case in which the intra prediction part is installed on a computer. Because $S(x, -1)-S(-1, -1)$ can have a negative value, ">>" is handled not as an arithmetic shift but as a logical shift, depending upon an implementation environment (compiler) and so on, and the computation result may differ from that acquired from the equation (2). To solve this problem, as an approximate expression of the equation (2) in the case of $u=2^{y+1}$ independent of any implementation environment, the following equation (2b) can be provided.

$$S'(x,y)=S(-1,y)+S(x,-1)\!\gg\!(y+1)-S(-1,-1)\!\gg\!(y+1) \quad (2b)$$

In the equation (2b), because a subtraction is carried out after the luminance values $S(x, -1)$ and $S(-1, -1)$ are right shifted by $(y+1)$ bits, respectively, the same computation result can be acquired for both arithmetic shift and logical shift when positive values are defined as the luminance values.

In addition, the block size of the prediction block $P_i^n$ on which the prediction process based on the equation (2) is carried out can be limited. In general, a block having a larger block size has various signal changes therein more easily, and there are few cases in which the prediction process on such a block can be carried out using a directional prediction with a high degree of accuracy. Therefore, for example, the equation (2) is not applied to any prediction block $P_i^n$ having a block size of 16×16 pixels or more and a predicted value based on a conventional horizontal prediction (the luminance value $S(-1, y)$ of an already-encoded pixel adjacent to the left of the prediction block $P_i^n$) is set as a predicted value of the prediction image, while the equation (2) is applied only to blocks each having a size smaller than 16×16 pixels, thereby being able to suppress the increase in the amount of computation while improving the prediction performance as compared with the case of using the conventional horizontal prediction.

Further, when the index value indicating the intra prediction mode for the prediction block $P_i^n$ is 3 (average (DC) prediction), the intra prediction part generates a prediction image by setting the average of the already-encoded pixels adjacent to the top of the prediction block $P_i^n$ and the already-encoded pixels adjacent to the left of the prediction block $P_i^n$ as the predicted value of each pixel in the prediction block $P_i^n$. When the index value indicating the intra prediction mode is other than 0 (planar prediction), 1 (vertical prediction), 2 (horizontal prediction), and 3 (average prediction), the intra prediction part generates a predicted value of each pixel in the prediction block $P_i^n$ on the basis of a prediction direction vector $v_p=(dx, dy)$ shown by the index value. As shown in FIG. 9, when the relative coordinates of each pixel in the prediction block $P_i^n$ are expressed as (x, y) with the pixel at the upper left corner of the prediction block $P_i^n$ being defined as the point of origin, each reference pixel which is used for prediction is located at a point of intersection of L shown below and an adjacent pixel.

$$L = \begin{pmatrix} x \\ y \end{pmatrix} + k v_p \quad (3)$$

where k is a negative scalar value.

When a reference pixel is at an integer pixel position, the value of the corresponding integer pixel is determined as the predicted value of the prediction target pixel, whereas when the reference pixel is not at an integer pixel position, the value of an interpolation pixel generated from the integer pixels which are adjacent to the reference pixel is determined as the predicted value of the prediction target pixel. In the example shown in FIG. 8, because a reference pixel is not located at an integer pixel position, the predicted value is interpolated from the values of two pixels adjacent to the reference pixel. The intra prediction part can use not only the adjacent two pixels but also one or more adjacent pixels to generate an interpolation pixel and determine the value of this interpolation pixel as the predicted value. While the increase in the number of pixels used for the interpolation process provides an advantage of improving the accuracy of computation of an interpolation pixel, because the degree of complexity of computations required for the interpolation process increases with the increase in the number of pixels used for the interpolation process, it is preferable to generate an interpolation pixel from a larger number of pixels in a case in which the moving image encoding device requires high encoding performance even if the arithmetic load is large. According to the same procedure, the intra prediction part generates prediction pixels for all the pixels of the luminance signal in the prediction block $P_i^n$, and outputs an intra prediction image $P_{INTRAi}^n$. The intra prediction parameters used for the generation of the intra prediction image $P_{INTRAi}^n$ are outputted to the variable length encoding part 13 in order to multiplex the intra prediction parameters into the bitstream.

Like in the case of an intra prediction on an 8×8-pixel block in MPEG-4 AVC/H.264 explained previously, as pixels which are used when carrying out an intra prediction, instead of pixels themselves in an already-encoded adjacent block, the pixels on which a filtering process is carried out can be alternatively used.

The intra prediction part also carries out an intra prediction process based on the intra prediction parameters (intra prediction mode) on each of the color difference signals of the prediction block $P_i^n$ according to the same procedure as that according to which the intra prediction part carries out the intra prediction process on the luminance signal, and outputs the intra prediction parameters used for the generation of the intra prediction image to the variable length encoding part 13. The intra prediction parameters (intra prediction mode) selectable for the color difference signals do not need to be the same as those for the luminance signal, and a conventional prediction method (MPEG-4 AVC/H.264) can be used for a vertical prediction and for a horizontal prediction. For example, in the case of a YUV 4:2:0 format, each of the color difference signals (U and V signals) is the one whose resolution is reduced to one-half that of the luminance signal (Y signal) both in a horizontal direction and in a vertical direction, and the complexity of each of the color difference signals is lower than that of the luminance signal and hence a prediction can be carried out on each of the color difference signals more easily than on the luminance signal. Therefore, by reducing the number of selectable intra prediction parameters (intra prediction mode) for each of the color difference signals to be smaller than that for the luminance signal, and using a conventional simple prediction method for each of vertical and horizontal predictions, a reduction in the code amount required to encode the intra prediction parameters (intra prediction mode) and a reduction in the amount of computation required to carry out the prediction process can be implemented without reducing the prediction efficiency too much.

1/t that is the scaling value used for a vertical prediction and 1/u that is the scaling value used for a horizontal prediction can be predetermined between the moving image encoding device and the moving image decoding device. As an alternative, the intra prediction part 4 of the moving image encoding device can output t and u to the variable length encoding part 13 on a per sequence basis or on a per picture basis, the variable length encoding part 13 can variable-length-encode t and u and then include encoded data of t and u in the bitstream, and the moving image decoding device can variable-length-decode the encoded data in the bitstream to acquire t and u, and use t and u. By thus being able to adaptively control t and u on a per sequence basis or on a per picture basis, the moving image encoding device can make the prediction process be more suitable for the characteristics of the video signal of the inputted image.

Further, the block size for which a vertical prediction based on the equation (1) is used and the block size for which a horizontal prediction based on the equation (2) is used can be predetermined between the moving image encoding device and the moving image decoding device. As an alternative, the intra prediction part 4 of the moving image encoding device can output an ON/OFF flag, which is set for each block size, showing whether a vertical prediction based on the equation (1) or a horizontal prediction based on the equation (2) is used for the block size to the variable length encoding part 13 on a per sequence basis or on a per picture basis, the variable length encoding part 13 can variable-length-encode the above-mentioned ON/OFF flag and include encoded data of the ON/OFF flag in the bitstream, and the moving image decoding device can variable-length-decode the encoded data in the bitstream to acquire the above-mentioned ON/OFF flag, and use the above-mentioned ON/OFF flag. By thus being able to adaptively control the block size for which a vertical prediction based on the equation (1) is used and the block size for which a horizontal prediction based on the equation (2) is used on a per sequence basis or on a per picture basis, the moving image encoding device can make the prediction process be more suitable for the characteristics of the video signal of the inputted image.

Next, the processing carried out by the moving image decoding device shown in FIG. 3 will be explained concretely. When receiving the bitstream generated by the moving image encoding device shown in FIG. 1, a variable length decoding part 31 carries out a variable length decoding process on the bitstream (step ST21 of FIG. 4) and decodes the frame size information on a per-sequence basis, each sequence consisting of one or more frames of pictures, or on a per-picture basis. At this time, when even either one of the parameter t of the scaling value used for a vertical prediction, the parameter u of the scaling value used for a horizontal prediction, and the ON/OFF flag, which is set for each block size, showing whether a vertical prediction based on the equation (1) or a horizontal prediction based on the equation (2) is used for the block size is variable-length-encoded and is multiplexed into the bitstream, the moving image decoding device decodes the encoded data in units of a unit in which the moving image encoding device shown in FIG. 1 carries out the encoding process (on a per sequence basis or on a per picture basis).

More specifically, the variable length decoding part 31 determines the largest encoding block size and the upper limit on the divided hierarchical layer number which are determined by the encoding controlling part 2 of the moving image encoding device shown in FIG. 1 according to the same procedure as that according to which the moving image encoding device does (step ST22). For example, when the largest encoding block size and the upper limit on the divided hierarchical layer number are determined according to the resolution of the video signal, the variable length decoding part determines the largest encoding block size on the basis of the decoded frame size information and according to the same procedure as that according to which the moving image encoding device does. When the largest encoding block size and the upper limit on the divided hierarchical layer number are multiplexed into the bitstream by the moving image encoding device, the variable length decoding part uses the values decoded from the bitstream. Hereafter, the above-mentioned largest encoding block size is referred to as the largest decoding block size, and a largest coding block is referred to as a largest decoding block in the moving image decoding device. The variable length decoding part 31 decodes the state of division of each largest decoding block as shown in FIG. 6 for each determined largest decoding block. The variable length decoding part hierarchically specifies decoding blocks (i.e., blocks corresponding to the "coding blocks" which are processed by the moving image encoding device shown in FIG. 1) on the basis of the decoded division state (step ST23).

The variable length decoding part 31 then decodes the encoding mode assigned to each decoding block. The variable length decoding part divides each decoding block into one or more prediction blocks each of which is a unit for prediction process on the basis of the information included in the decoded encoding mode, and decodes the prediction parameters assigned to each of the one or more prediction blocks (step ST24).

More specifically, when the encoding mode assigned to a decoding block is an intra encoding mode, the variable length decoding part 31 decodes the intra prediction parameters for each of the one of more prediction blocks which are included in the decoding block and each of which is a prediction unit. In contrast, when the encoding mode assigned to a decoding block is an inter encoding mode, the variable length decoding part decodes the inter prediction parameters and the motion vector for each of the one of more prediction blocks which are included in the decoding block and each of which is a prediction unit (step ST24).

The variable length decoding part 31 further divides the decoding block into one or more transformation blocks each of which is a unit for transformation process on the basis of the transformation block size information included in the prediction difference encoding parameters, and decodes the compressed data (transform coefficients transformed and quantized) about each transformation block (step ST24).

When the encoding mode m(B") variable-length-decoded by the variable length decoding part 31 is an intra encoding mode (when m(B")∈INTRA), the select switch 33 outputs the intra prediction parameters of each prediction block unit, which are variable-length-decoded by the variable length decoding part 31, to the intra prediction part 34. In contrast, when the encoding mode m(B″) variable-length-decoded by the variable length decoding part 31 is an inter encoding mode (when m(B″)∈INTER), the select switch outputs the inter prediction parameters and the motion vector of each prediction block unit, which are variable-length-decoded by the variable length decoding part 31, to the motion compensation part 35.

When the encoding mode m(B″) variable-length-decoded by the variable length decoding part 31 is an intra encoding mode (m(B″)∈INTRA) (step ST25), the intra prediction part 34 receives the intra prediction parameters of each prediction block unit outputted from the select switch 33, and carries out an intra prediction process on each prediction block $P_i^n$ in the decoding block B″ using the above-mentioned intra prediction parameters by referring to the decoded image stored in the memory 37 for intra prediction to generate an intra prediction image $P_{INTRAi}^n$ according to the same procedure as that which the intra prediction part 4 shown in FIG. 1 uses (step ST26). More specifically, when the index value showing the intra prediction mode for the prediction block $P_i^n$ is 0 (vertical prediction), the intra prediction part 34 calculates a predicted value of each pixel in the prediction block $P_i^n$ according to the above-mentioned equation (1) to generate an intra prediction image $P_{INTRAi}^n$. Further, when the index value showing the intra prediction mode for the prediction block $P_i^n$ is 1 (horizontal prediction), the intra prediction part 34 calculates a predicted value of each pixel in the prediction block $P_i^n$ according to the above-mentioned equation (2) to generate an intra prediction image $P_{INTRAi}^n$. In this case, when the block size for which a vertical prediction based on the equation (1) or a horizontal prediction based on the equation (2) is used is limited, an intra prediction process based on a conventional vertical or horizontal prediction (MPEG-4 AVC/H.264) is carried out on the prediction block $P_i^n$ when the prediction block $P_i^n$ has a size other than the block size for which a vertical prediction based on the equation (1) or a horizontal prediction based on the equation (2) is used.

When the encoding mode m(B″) variable-length-decoded by the variable length decoding part 31 is an inter encoding mode (m(B″)∈INTER) (step ST25), the motion compensation part 35 receives the motion vector and the inter prediction parameters of each prediction block unit which are outputted from the select switch 33, and carries out an inter prediction process on each prediction block $P_i^n$ in the decoding block using the above-mentioned motion vector and the above-mentioned inter prediction parameters while referring to the decoded image which is stored in the motion-compensated prediction frame memory 39 and on which the filtering process is carried out to generate an inter prediction image $P_{INTERi}^n$ (step ST27).

When receiving the compressed data and the prediction difference encoding parameters from the variable length decoding part 31, the inverse quantization/inverse transformation part 32 inverse-quantizes the compressed data by referring to the prediction difference encoding parameters according to the same procedure as that according to which the inverse quantization/inverse transformation part 8 shown in FIG. 1 does, and also carries out an inverse orthogonal transformation process on the transform coefficients which are the compressed data which the inverse quantization/inverse transformation unit inverse-quantizes by referring to the prediction difference encoding parameters to calculate a decoded prediction difference signal which is the same as the local decoded prediction difference signal outputted from the inverse quantization/inverse transformation part 8 shown in FIG. 1 (step ST28).

The adding part 36 adds the decoded prediction difference signal calculated by the inverse quantization/inverse transformation part 32 and either the intra prediction image $P_{INTRAi}^n$ generated by the intra prediction part 34 or the inter prediction image $P_{INTERi}^n$ generated by the motion compensation part 35 to calculate a decoded image and output this decoded image to the loop filtering part 38, and also stores the decoded image in the memory 37 for intra prediction (step ST29). This decoded image is a decoded image signal which is used at the time of subsequent intra prediction processes.

When completing the processes of steps ST23 to ST29 on all the decoding blocks B″ (step ST30), the loop filtering part 38 carries out a predetermined filtering process on the decoded image outputted from the adding part 36, and stores the decoded image on which the loop filtering part carries out the filtering process in the motion-compensated prediction frame memory 39 (step ST31). The filtering process by the loop filtering part 38 can be carried out on each largest decoding block of the decoded image inputted thereto or each decoding block of the decoded image inputted thereto. As an alternative, after one picture of decoded images is inputted, the loop filtering part can carry out the filtering process on the picture of decoded images at a time. As examples of the predetermined filtering process, there can be provided a process of filtering a block boundary between coding blocks in such a way that the discontinuity (block noise) at the boundary does not come into prominence, a filtering process of compensating for a distortion occurring in the decoded image, and so on. This decoded image is a reference image for motion-compensated prediction, and is also a reproduced image.

As can be seen from the above description, the intra prediction part 4 of the moving image encoding device according to this Embodiment 3 is constructed in such a way as to, when the intra-frame prediction process at the time of generating a prediction image is a horizontal one, adding a value proportional to a change in a horizontal direction of the luminance values of pixels adjacent to the top of the prediction block to the luminance value of a pixel adjacent to the left of the prediction block to determine the result of the addition as a predicted value of the prediction image, whereas when the intra-frame prediction process at the time of generating a prediction image is a vertical one, adding a value proportional to a change in a vertical direction of the luminance values of pixels adjacent to the left of the prediction block to the luminance value of the pixel adjacent to the top of the prediction block to determine the result of the addition as a predicted value of the prediction image. Therefore, there is provided an advantage of being able to implement a high-accuracy prediction, thereby improving the image quality, even when the signal value varies along the prediction direction.

Further, the intra prediction part 34 of the moving image decoding device according to this Embodiment 3 is constructed in such a way as to, when the intra-frame prediction process at the time of generating a prediction image is a horizontal one, adding a value proportional to a change in a horizontal direction of the luminance values of pixels adjacent to the top of a prediction block to the luminance value of a pixel adjacent to the left of the prediction block to determine the result of the addition as a predicted value of the prediction image, whereas when the intra-frame prediction process at the time of generating a prediction image is a vertical one, adding a value proportional to a change in a vertical direction of the luminance values of pixels adjacent to the left of the prediction block to the luminance value of the pixel adjacent to the top of the prediction block to determine the result of the addition as a predicted value of the prediction image. Therefore, there is provided an advantage of being able to implement a high-accuracy prediction, thereby improving the image quality, even when the signal value varies along the prediction direction.

According to this Embodiment 3, because 1/u which is the scaling value used when a horizontal prediction process is carried out by each of the intra prediction parts 4 and 34 is configured in such a way that the scaling value set for each row in the prediction block decreases with distance from the pixels adjacent to the top of the prediction block, the longer distance from the pixels adjacent to the top of the prediction block, and hence the lower correlation with the pixels the target pixel to be predicted has, the less influence of the pixels adjacent to the top of the prediction block can be exerted on the target pixel to be predicted. As a result, there is provided an advantage of being able to carryout the prediction process with a high degree of accuracy. Further, because 1/t which is the scaling value used when a vertical prediction process is carried out by each of the intra prediction parts 4 and 34 is configured in such away that the scaling value set for each column in the prediction block decreases with distance from the pixels adjacent to the left of the prediction block, the longer distance from the pixels adjacent to the left of the prediction block, and hence the lower correlation with the pixels the target pixel to be predicted has, the less influence of the pixels adjacent to the left of the prediction block can be exerted on the target pixel to be predicted. As a result, there is provided an advantage of being able to carry out the prediction process with a high degree of accuracy.

In this Embodiment 3, the example in which the scaling value set for the N-th row in the prediction block at the time that a horizontal prediction process is carried out by each of the intra prediction parts 4 and 34 is $1/2^{N+1}$ (=½, ¼, ⅛, ¹⁄₁₆, ...) and the scaling value set for the M-th column in the prediction block at the time that a vertical prediction process is carried out by each of the intra prediction parts 4 and 34 is $1/2^{M+1}$ (=½, ¼, ⅛, ¹⁄₁₆, ...) is shown. This is only an example. The scaling value set for the N-th row in the prediction block can be arbitrary at the time that a horizontal prediction process is carried out by each of the intra prediction parts 4 and 34 as long as the scaling value decreases with distance from the pixels adjacent to the top of the prediction block, and the scaling value set for the M-th column in the prediction block can be arbitrary at the time that a vertical prediction process is carried out by each of the intra prediction parts 4 and 34 as long as the scaling value decreases with distance from the pixels adjacent to the left of the prediction block.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The present invention is suitable for a moving image encoding device that needs to encode a moving image with a high degree of efficiency, and is also suitable for a moving image decoding device that needs to decode a moving image which is encoded with a high degree of efficiency.

EXPLANATIONS OF REFERENCE NUMERALS

1 block dividing part (block division unit), 2 encoding controlling part (encoding control unit), 3 select switch, 4 intra prediction part (intra prediction unit), 5 motion-compensated prediction part (motion-compensated prediction unit), 6 subtracting part (quantizing unit), 7 transformation/quantization part (quantizing unit), 8 inverse quantization/inverse transformation part, 9 adding part, 10 memory for intra prediction (intra prediction unit), 11 loop filtering part, 12 motion-compensated prediction frame memory (motion-compensated prediction unit), 13 variable length encoding part (variable length encoding unit), 31 variable length decoding part (variable length decoding unit), 32 inverse quantization/inverse transformation part (inverse quantizing unit), 33 select switch, 34 intra prediction part (intra prediction unit), 35 motion compensation part (motion-compensated prediction unit), 36 adding part, 37 memory for intra prediction (intra prediction unit), 38 loop filtering part, 39 motion-compensated prediction frame memory (motion-compensated prediction unit).

The invention claimed is:
1. An image decoding device comprising:
an intra prediction unit for, when a coding mode for a coding block is an intra coding mode, carrying out an intra-frame prediction process on each of processing blocks to generate a prediction image, each of the processing blocks being the coding block or a sub-block obtained by dividing the coding block,
wherein, when an intra prediction parameter indicates a horizontal prediction process and a size of the processing block is less than a predetermined size, said intra prediction unit adds a value to a signal value of a pixel adjacent to left of said processing block and outputs a result of the addition as a predicted value of said prediction image, the value being proportional to an amount of change in a horizontal direction of signal values of pixels adjacent to top of said processing block, and
when the intra prediction parameter indicates the horizontal prediction process and the size of the processing block is greater than or equal to the predetermined size, said intra prediction unit outputs the signal value of the pixel adjacent to left of the processing block as the predicted value of the prediction image.
2. An image encoding device comprising:
an intra prediction unit for, when a coding mode for a coding block is an intra coding mode, carrying out an intra-frame prediction process on each of processing blocks to generate a prediction image, each of the processing blocks being the coding block or a sub-block obtained by dividing the coding block,
wherein, when an intra prediction parameter indicates a horizontal prediction process and a size of the processing block is less than a predetermined size, said intra prediction unit adds a value to a signal value of a pixel adjacent to left of said processing block and outputs a result of the addition as a predicted value of said prediction image, the value being proportional to an amount of change in a horizontal direction of signal values of pixels adjacent to top of said processing block, and
when the intra prediction parameter indicates the horizontal prediction process and the size of the processing block is greater than or equal to the predetermined size, said intra prediction unit outputs the signal value of the pixel adjacent to left of the processing block as the predicted value of the prediction image.

3. An image encoding method comprising an intra prediction processing step, performed by an intra prediction unit, including process of, when a coding mode for a coding block is an intra coding mode, carrying out an intra-frame prediction process on each of processing blocks to generate a prediction image, each of the processing blocks being the coding block or a sub-block obtained by dividing the coding block, when an intra prediction parameter indicates a horizontal prediction process and a size of the processing block is less than a predetermined size, adding a value to a signal value of a pixel adjacent to left of said processing block and outputting a result of the addition as a predicted value of said prediction image, the value being proportional to an amount of change in a horizontal direction of signal values of pixels adjacent to top of said processing block, and when the intra prediction parameter indicates the horizontal prediction process and the size of the processing block is greater than or equal to the predetermined size, outputting, the signal value of the pixel adjacent to left of the processing block as the predicted value of the prediction image.

4. An image decoding method comprising an intra prediction processing step, performed by an intra prediction unit, including process of, when a coding mode for a coding block is an intra coding mode, carrying out an intra-frame prediction process on each of processing blocks to generate a prediction image, each of the processing, blocks being the coding block or a sub-block obtained by dividing the coding block, when an intra prediction parameter indicates a horizontal prediction process and a size of the processing block is less than a predetermined size, adding a value to a signal value of a pixel adjacent to left of said processing block and outputting a result of the addition as a predicted value of said prediction image, the value being proportional to an amount of change in a horizontal direction of signal values of pixels adjacent to top of said processing block, and when the intra prediction parameter indicates the horizontal prediction process and the size of the processing block is greater than or equal to the predetermined size, outputting the signal value of the pixel adjacent to left of the processing block as the predicted value of the prediction image.

5. A non-transitory computer-readable medium storing a bitstream decoded by an image decoding device carrying out a prediction process on each of processing blocks to generate a prediction image, each of the processing blocks being a coding block or a sub-block obtained by dividing the coding block, said bitstream comprising:

a coding mode for the coding block, an intra prediction parameter indicating an intra prediction mode and used for carrying out an intra-frame prediction process on each of the processing blocks when the coding mode is an intra coding mode, information defining a block size of each of the processing blocks, and compressed data generated by carrying out a compression process on a difference between an image of each of the processing blocks and each of the prediction image, wherein, when the coding mode is an intra coding mode and the intra prediction parameter indicates a horizontal prediction process, the prediction image is generated by the image decoding device, wherein, when the block size is less than a predetermined size, the image decoding device adds a value to a signal value of a pixel adjacent to left of the processing block and outputs a result of the addition as the predicted value of the prediction image, the value being proportional to an amount of change in a horizontal direction of signal values of pixels adjacent to top of the processing block, and when the block size is greater than or equal to the predetermined size, the image decoding device outputs the signal value of the pixel adjacent to left of the processing block as the predicted value of the prediction image.

* * * * *